(12) United States Patent
    Reindel et al.

(10) Patent No.: US 12,609,608 B2
(45) Date of Patent: Apr. 21, 2026

(54) MAINS RECONSTRUCTION UNIT

(71) Applicant: KCC Scientific, LCC, Broomfield, CO (US)

(72) Inventors: Kenneth Alan Reindel, Broomfield, CO (US); Raymundo Josue Medina, Austin, TX (US)

(73) Assignee: KCC Scientific, LLC, Broomfield, CO (US)

( * ) Notice: Subject to any disclaimer, the term of this patent is extended or adjusted under 35 U.S.C. 154(b) by 393 days.

(21) Appl. No.: 18/295,782

(22) Filed: Apr. 4, 2023

(65) Prior Publication Data

US 2024/0186890 A1     Jun. 6, 2024

Related U.S. Application Data

(60) Provisional application No. 63/328,699, filed on Apr. 7, 2022.

(51) Int. Cl.
| | |
|---|---|
| *H02M 5/453* | (2006.01) |
| *H02M 1/36* | (2007.01) |
| *H02M 1/42* | (2007.01) |
| *H02M 1/44* | (2007.01) |

(52) U.S. Cl.
CPC ........... *H02M 1/4233* (2013.01); *H02M 1/36* (2013.01); *H02M 1/44* (2013.01); *H02M 5/453* (2013.01)

(58) Field of Classification Search
CPC ........ H02M 7/4803; H02M 1/44; H02M 1/36; H02M 5/40–4585
See application file for complete search history.

(56) References Cited

U.S. PATENT DOCUMENTS

| | | | | |
|---|---|---|---|---|
| 5,465,011 | A | * | 11/1995 | Miller ..................... H02J 9/062 |
| | | | | 307/64 |
| 2002/0140403 | A1 | * | 10/2002 | Reddy ..................... H02J 9/062 |
| | | | | 320/162 |
| 2013/0300194 | A1 | * | 11/2013 | Palmer .............. H02J 13/00026 |
| | | | | 307/23 |
| 2016/0268950 | A1 | * | 9/2016 | Cho ......................... H02P 27/14 |
| 2019/0363645 | A1 | * | 11/2019 | Yu ...................... H02M 3/33592 |
| 2020/0203969 | A1 | * | 6/2020 | Truettner ............ H02J 7/00309 |
| 2022/0077701 | A1 | * | 3/2022 | Yang ..................... H02J 7/0044 |

(Continued)

*Primary Examiner* — Alex Torres-Rivera
(74) *Attorney, Agent, or Firm* — J.A. LLC; Galen Peterson; John Arsenault

(57)                ABSTRACT

The present disclosure includes a precision voltage and frequency converter, comprising of a power factor correction circuit configured to correct the conduction angle of input AC current, in phase with AC voltage source, a reserve DC filter and energy storage unit, a multi-phase unfolding bridge circuit configured to receive a rectified, isolated, and filtered DC voltage derived from the input AC, a voltage and current feedback pulse-width modulator circuit and compensation circuit configured to modify a signal from the multi-phase unfolding bridge circuit, an isolation transformer having a first side and a second side, wherein the isolation transformer is configured to receive an unfolded half-sine signal generated by the multi-phase unfolding bridge on the first side, the second side of the transformer is regulated via an isolated feedback voltage control circuit and compensation circuit to generate on the second side a first output precision voltage and frequency converted AC signal.

19 Claims, 20 Drawing Sheets

PVFC/MRU Overall Block Diagram 100

(56) References Cited

U.S. PATENT DOCUMENTS

| | | | |
|---|---|---|---|
| 2022/0085724 A1* | 3/2022 | Strijker | H02M 3/01 |
| 2023/0223831 A1* | 7/2023 | Huang | H02M 7/4807 |
| | | | 363/17 |
| 2023/0283169 A1* | 9/2023 | Chen | H02M 7/06 |
| | | | 363/37 |

* cited by examiner

PVFC/MRU Overall
Block Diagram
100**

Figure 2A:
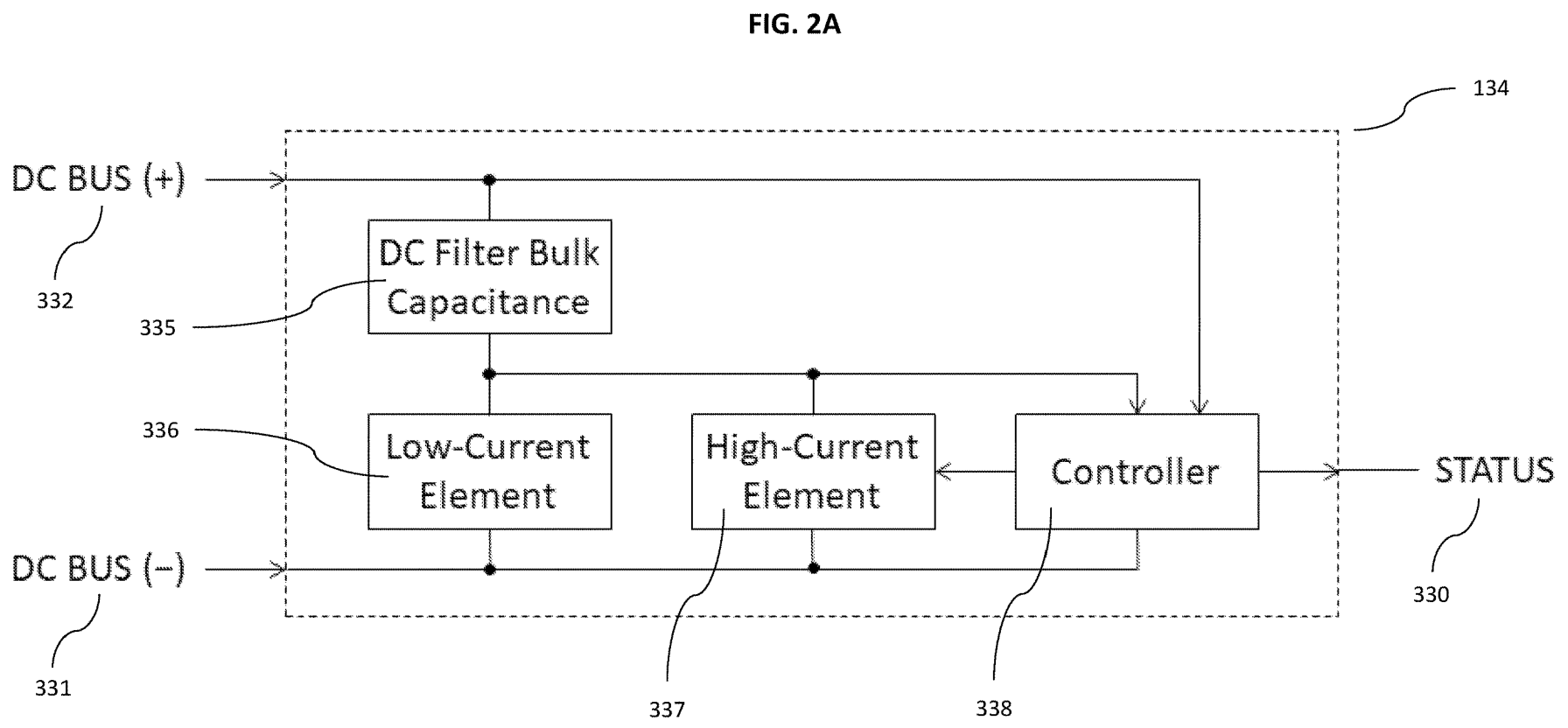

DC BUS (+)  332

DC BUS (−)  331

DC Filter Bulk Capacitance  335

Low-Current Element  336

High-Current Element  337

Controller  338

STATUS  330

MAINS RECONSTRUCTION UNIT

CROSS REFERENCE TO RELATED APPLICATIONS

This Application claims priority to U.S. Provisional Patent Application No. 63/328,699 filed on Apr. 7, 2022, entitled "MAINS Reconstruction Unit," which is hereby incorporated herein by reference in its entirety.

TECHNICAL FIELD

The present disclosure relates to electrical power conversion methods and apparatuses and more specifically to universal voltage and frequency conversion exhibiting highly stable output.

BACKGROUND

Numerous electronic appliances require a stable power source with substantially precise voltage and frequency for operation, especially concerning sensitive, critical equipment encountered with instrumentation, metrology, calibration, high performance audio preamplifiers, laboratory equipment, amplifiers, vintage or new turntables, and other high performance sound reproduction systems. Typical inverters utilize a bridge output, which provides a complementary drive to the load directly. For example, a typical 115V AC inverter will connect the MOSFET bridge through a pulse width modulation (PWM) filter directly to the output load, which generally requires a high voltage DC rail and associated components, along with a full sine wave drive and several inherent potential errors of the drive.

Typical inverters thus include several disadvantages such as problems when driving output transformers that do not tolerate asymmetric signals or DC offsets. Most traditional inverters are designed for DC inputs, which require the user to provide a power supply to convert the AC mains supply to a DC value, a difficult and expensive conversion for most users. Additionally, most inverters will exhibit high levels of common mode noise, which flows into the device being powered by a traditional inverter finding its way to earth ground, and thus creating a high-frequency ground loop. This high-frequency ground loop inherent to traditional inverters can result in measurement or audio noise once the device is powered. Likewise, traditional inverters do not have the ability to select between frequencies of 50 Hz or 60 Hz, nor select between AC voltages of 115V or 230V. Finally, traditional inverters lack the capability to select for highly precise frequencies required for sensitive and critical equipment.

SUMMARY

The present disclosure provides a universal power converter, or mains reconstruction unit, for converting a variety of DC and AC inputs into mains power that exhibits substantially low or negligible DC offset and exceptional frequency stability. The power converter is configured to dramatically reduce or eliminate damage to sensitive equipment due to spikes and aberrations from mains power caused by infrastructure erosion, differing electrical voltage standards, or over-stress. Furthermore, the power converter is configured to remove DC offsets from incoming mains power due to phase imbalances caused by appliances, such as: industrial electric motor startup surges, laboratory heat guns, hair dryers, photovoltaics, and/or electric vehicle chargers.

An apparatus for precision voltage and frequency converter is described. The apparatus may include an AC input receptacle for receiving an input AC signal, a power factor correction circuit configured to convert the input AC signal to a regulated DC output, a multi-phase unfolding bridge circuit configured to convert the regulated DC output to a substantially pure sinusoidal AC output, an AM filter block configured to filter electromagnetic interference noise, an isolation transformer having a primary side and a secondary side, wherein the isolation transformer is configured to receive a full sine wave drive, generated by a dual-phase unfolding bridge circuit and filtered by a modulator output filter and compensation block. This full sine wave drive at the primary side generates on the secondary side a first output AC signal having a first output amplitude, a first output frequency, a first output voltage, a first output impedance, and a first output current, wherein the AM filter block is configured to filter the first output frequency.

In a related aspect, the multi-phase unfolding bridge circuit generates a highly precise sine wave, driven by the MCU and Waveform DAC and controlled by the multi-phase balancing servo, with feedback from the output side of the Modulator Output Filter and Compensation, as is presented to the primary side of the output isolation transformer.

An apparatus for mains AC reconstruction is described. The apparatus may comprise an input filter configured to receive an input AC power and deliver a filtered signal to a power factor correction circuit that converts the filtered input AC power to a corrected, regulated DC signal output, where the regulated DC signal output is filtered by a reserve DC filter and energy storage unit. Because of the capacitance required for short-term reserve capacity, soft-start is necessary for both proper start-up of the power factor corrected power supply and to limit inrush currents to safe levels through bulk capacitance C1.

In a related aspect, an isolated feedback voltage loop regulator and an isolated feedback voltage control circuit configured to filter the first output AC signal via the secondary side of the isolation transformer and return a feedback signal to the first side of the isolation transformer is contemplated. In some embodiments the isolated feedback and voltage control circuit comprises a full-wave rectifier, a peak regulator, optical isolation, a reference amplifier, and involves a sine generator.

An apparatus for compensating for an electrical signal via a current feed-forward compensation circuit is described, comprising at least a power amplifier, the output isolation boost transformer, feed-forward amplifier, reference amplifier, and involves the half-sine generator. The feed-forward compensation circuit is configured so that the half-sine current through the boost transformer is sensed, and a proportional compensating signal is applied to the half-sine generator via the feed-forward amplifier.

An apparatus for isolated feedback and voltage control is also described. The isolated feedback and voltage control circuit comprises at least a power amplifier, a boost transformer, a full-wave rectifier, a peak regulator, optical isolation, a reference amplifier, and a sine generator. The power amplifier is configured to modulate an input DC signal and transmit to the boost transformer resulting in an output AC signal. The output AC signal has a negative and positive component. A feedback loop is configured to receive the output AC signal negative and positive components to modify the negative and positive components and deliver a rectified signal to the power amplifier via the full wave rectifier which is configured to receive the output AC signals, a peak regulator which is configured to receive an output form the full-wave rectifier, an optical isolation which is configured to receive an output from the peak regulator, a reference amplifier which is configured to receive an output from the optical isolation and a sine generator which is configured to receive an output from the reference amplifier and deliver a signal to the power amplifier with a phase matched output. The full-wave rectifier is configured to rectify an AC waveform of the output AC signal, the peak regulator is configured to regulate the peak voltage of the output AC signal across the negative and positive components within a peak regulation range as determined by a peak regulation setpoint.

A method of converting AC power is also described herein. The present method may include removing aberrations, noise, frequency and amplitude distortions, or load errors due to dissipative copper losses in an external power distribution system via a precision voltage and frequency converter, comprising of receiving an input AC current having a conduction angle via an AC input receptacle, correcting the conduction angle via a power factor correction circuit, wherein the power factor correction circuit can correct a signal by inverting the corrected conduction angle of the input AC current, via a multi-phase unfolding bridge circuit and creating an output signal, converting the output signal from a multi-phase unfolding bridge circuit via a modulator output filter and compensation circuit and generating a half-sine synchronized phase reversing signal, transforming the half-sine synchronized phase reversing signal via an output transformer generating an output AC signal having an output amplitude, an output frequency, an output voltage, an output impedance, and an output current.

Embodiments include one, more, or any combination of the various apparatus and methods described herein. Other features and advantages of the present disclosure will become apparent from following the more detailed description, taken in conjunction with the accompanying drawings, which illustrate, by way of example, the principles of the disclosure.

BRIEF DESCRIPTION OF THE DRAWINGS

FIG. 2A illustrates a block diagram of a reserve DC filter and energy storage unit, according to embodiments of the present disclosure.

FIG. 3A illustrates an example electrical schematic of a voltage feedback with cycle-by-cycle current limit PWM modulator, according to embodiments of the present disclosure.

FIG. 3C illustrates an example of a dual-phase unfolding bridge cycle-by-cycle current limit PWM modulator.

FIG. 5B illustrates an example electrical schematic of an isolated feedback loop regulator circuit, according to embodiments of the present disclosure.

Corresponding reference characters indicate corresponding parts throughout the several views.

Figure 1A:
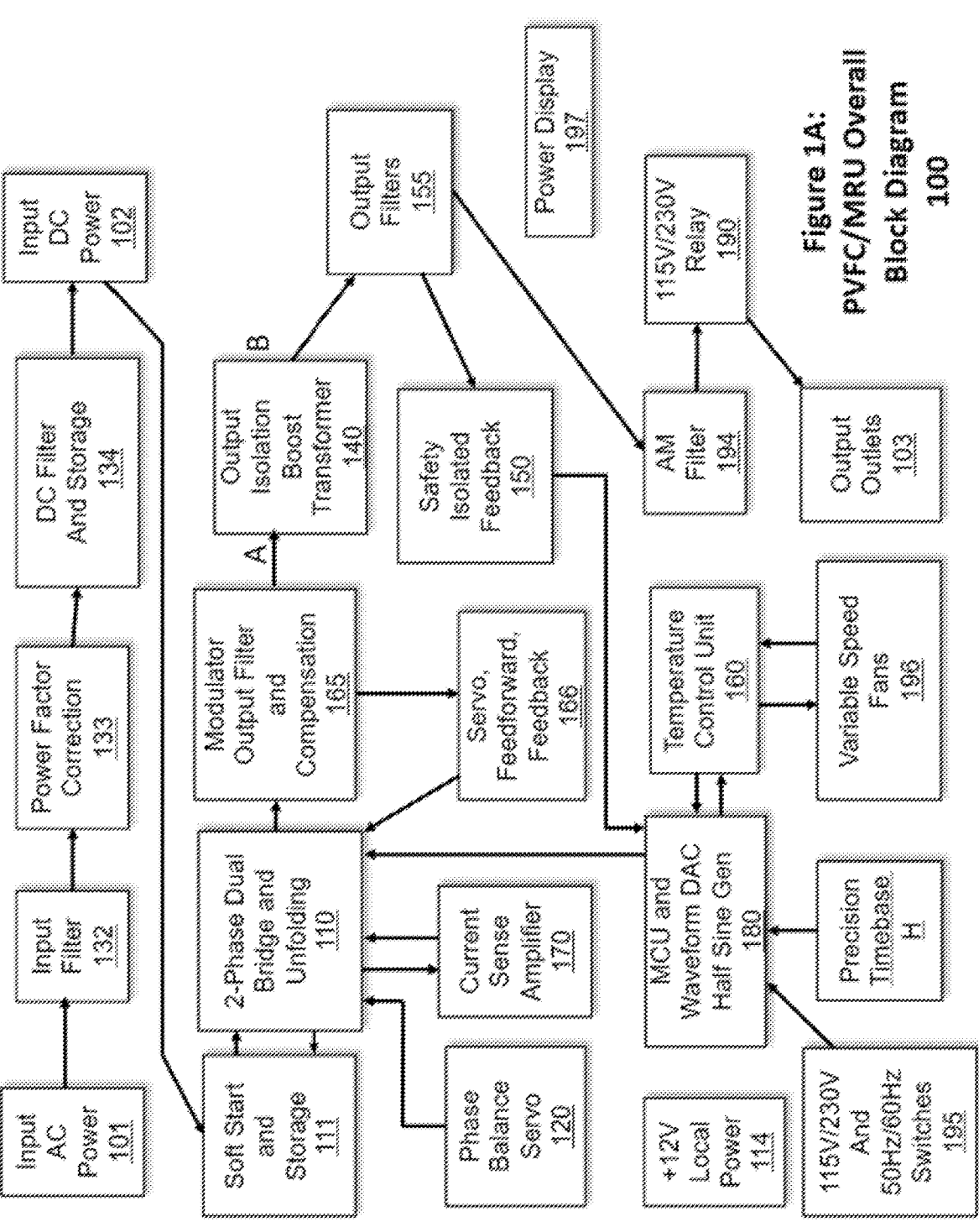
FIG. 1A illustrates an overall block diagram of a precision voltage and frequency converter, according to embodiments of the present disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all possible modifications, equivalents, and alternatives falling within the scope of the disclosure as defined by the appended claims.

DETAILED DESCRIPTION

The following detailed description illustrates embodiments of the disclosure and manners by which they can be implemented. Although the best mode of carrying out the present disclosure has been disclosed, those skilled in the art would recognize that other embodiments for carrying out or practicing the present disclosure are also possible.

It should be noted that the terms "first," "second," and the like, herein do not denote any order, quantity, or importance, but rather are used to distinguish one element from another. Further, the terms "a" and "an" herein do not denote a limitation of quantity, but rather denote the presence of at least one of the referenced items.

Some embodiments of the present disclosure eliminate the typical issues inherent of inverters by generating a half-sine signal by the MCU and waveform DAC, then unfolding the half-sine signal into a full sinusoidal signal via a dual-phase unfolding bridge block and function to yield a symmetric output absent of any DC component and thus ideal for driving an output isolation boost transformer. The output transformer, in turn, assures that the signal delivered to output outlets or to a device in use is free of DC components.

FIG. 1A is a block diagram illustrating a precision voltage and frequency converter (PVFC) 100 or mains reconstruction unit (MRU), in accordance with an exemplary embodiment of the present disclosure. In a preferred embodiment, the PVFC 100 comprises a dual-phase step-down converter 110, control, drivers, and current sense amplifier circuit (CSA) 170, a waveform digital to analog converter (DAC) driven by a microcontroller unit with a half-sine algorithm and unfolding drive 180, a safety isolated feedback block 150, an output isolation boost transformer 140 having a primary side 140a and a second side 140b, (additional to the output transformer), a phase balance servo 120, feedback and feed-forward compensation subsystem 166, output filters 155, an outlet relay 190, an AM filter block 194 on the second side 140b of the output isolation boost transformer 140, a power factor correction circuit (PFC) 133 (AC-DC universal input), and DC Filter and Energy Storage Unit 134 with soft-start circuit 111.

As used herein, "dual-phase step down converter" can include the component of a dual-phase unfolding bridge circuit as described in various embodiments of the present disclosure.

Control, drivers, and CSA 170 protect the dual-phase step-down converter 110 function by means of switching cycle-by-cycle current-limited control embodied in the CSA 170. The CSA 170 embodied in the present disclosure can utilize a plurality of precision, non-inductive low-value resistors in a network to sense the current through each leg of the output bridge; this works advantageously with the dual-phase step-down converter 110 because current is sensed on the high-side of the cycle of each half-bridge with the same low-value resistor network.

The DC Filter and Energy Storage Unit 134 can provide two functions in the preferred embodiment. First, it filters the output of the PFC 133, which is converting mains AC voltage into DC. Second, it provides a short-term energy reserve for the PVFC 100 dual-phase step-down converter 110 so that the input DC power 102 remains stable in response to load changes presented to the output outlets 103.

The dual-phase step-down converter 110 is operating at PWM modulation frequencies, typically between 60 kHz and 200 kHz, and as such can be a source of electromagnetic interference (EMI) noise if not properly managed. The EMI noise can be mitigated by operation at low-voltage, but EMI noise is reduced in the present embodiments via the PVFC 100 output filters 155. As part of this, AM filtering of common-mode harmonics occurs using an AM filter block 194. With these in place, the PVFC 100 can power sensitive radios and similar devices with little or no interference across the AM and FM bands, another major advantage over traditional inverters. In various embodiments, the PVFC 100 may further comprise a temperature monitoring and temperature control unit 160. The temperature control unit 160 can continually monitor the internal temperature of the equipment and adjust the operation of one or more fans at low speeds, up to and beyond, half power. In some embodiments the temperature control unit 160 enables quiet operation while insuring the operating temperature of the PVFC 100 can be extended past 40 degrees C., while maintaining internal hot spot temperatures below 110 degrees C. Maintaining the PVFC 100 hot spot temperatures below 110 degrees C. may be accomplished by a variety of elements, in addition to the temperature control unit 160, through the use of a temperature sensor, a thermal control microcontroller, and fans, heat sinks, liquid cooling systems, or any combination thereof. However, it is further contemplated that other methods of determining, adjusting, or maintaining the temperature are suitable without deviating from the scope of the disclosure.

In various embodiments, the PVFC 100 may further comprise an output power indication display 197 for displaying the power level at the output outlets 103, and/or an overload indicator LED for indicating to a user when the output of the PVFC 100 is operated beyond the maximum output power level for which the PVFC 100 was designed. Furthermore, the PVFC 100 will further user-selectable switches 195 to configure the output for 50 Hz, 60 Hz, 115V AC or 230V AC per customer application. In various embodiments, the PVFC 100 may further comprise one or more output receptacles for varying one or more output voltages as per region or country configurations and compliance with local regulatory requirements.

In various embodiments, the PVFC 100 offers the ability to transform mains power to match equipment requirements regardless of its country of origin. In various embodiments, the PVFC 100 may further comprise an improved loop regulator configured to directly sense the output AC signal and cause the safety isolated feedback circuit to precisely control the output AC amplitude to better than 1% line and load regulation. Versions of this embodiment provide for a product line comprising multiple products having varying power levels at different price points, to make this technology available at more budgetarily modest levels, but for more targeted, limited use.

During operation of the PVFC 100, an input AC power 101 having aberrations, potential DC offsets, and/or noise may be directed to the input filter 132 of the power factor correction circuit (PFC) 133, wherein it is converted into a filtered corrected signal, a regulated DC output, which is typically 48V DC, though other voltages are contemplated to suffice without deviating from the scope of the present disclosure. This input DC power 102 may then be converted and made available as a +12V local DC power source and may also be directed to the soft-start circuit 111. The soft-start circuit 111 is designed to prevent input surges from shutting down the PFC 133, to protect fuses from damage within the PFC 133, and for preventing false triggering of protection functions. The soft-start circuit 111 may generally store up to 10,000 µF (up to 10 milli-Farads) and possibly more, which represents a significant transient load to PFC 133; however such values of storage are necessary for adequate delivery of sine peak outputs to outlets 103 by way of the dual-phase step-down converter 110 functions.

During operation of the PVFC 100, the dual-phase step-down converter 110, 201 may receive an input DC power 102 through the soft-start circuit 111 and, under the control of the MCU and DAC 180, CSA 170, Feedback and feed-forward compensation subsystem 166, Phase Balance Servo 120, and safety isolated feedback block 150, transforms the input DC power 102 into a substantially pure sinusoidal AC output which drives output isolation boost transformer 140 50-1 khz. The AC output is sensed through the safety isolated feedback block 150 and then used to modify the MCU and DAC 180 so as to provide precision output AC voltage regulation regardless of input mains variations or output loads presented to the output outlets 103. In various embodiments, the MCU and DAC 180 will generate a half-sine synchronized phase reversing signal using the precision timebase H for frequency regulation of 0.0002% or better.

Some embodiments of the present disclosure include a PFVC 100 in which the MOSFET bridges in the dual-phase step-down converter 110 are operable at reduced voltages. The MOSFET devices can thus be selected which have a substantially lower drain to source on resistance and a substantially lower reverse recovery charge than would be possible otherwise. This is significant as these two parameters contribute heavily to both DC and AC power losses in any bridge when operated at typical PWM frequencies between 60 kHz and 200 kHz. As a result, the typical requirement for heat sinking or other forms of thermal control becomes greatly reduced in a practical realization of the present disclosure, even with an output power of 1000 watts or greater; an aspect of the present disclosure that provides a considerable improvement to efficiency, a significant reduction in manufacturing and operating costs, and allows for a more compact, lightweight, and less noisy universal converter system.

Figure 1B:
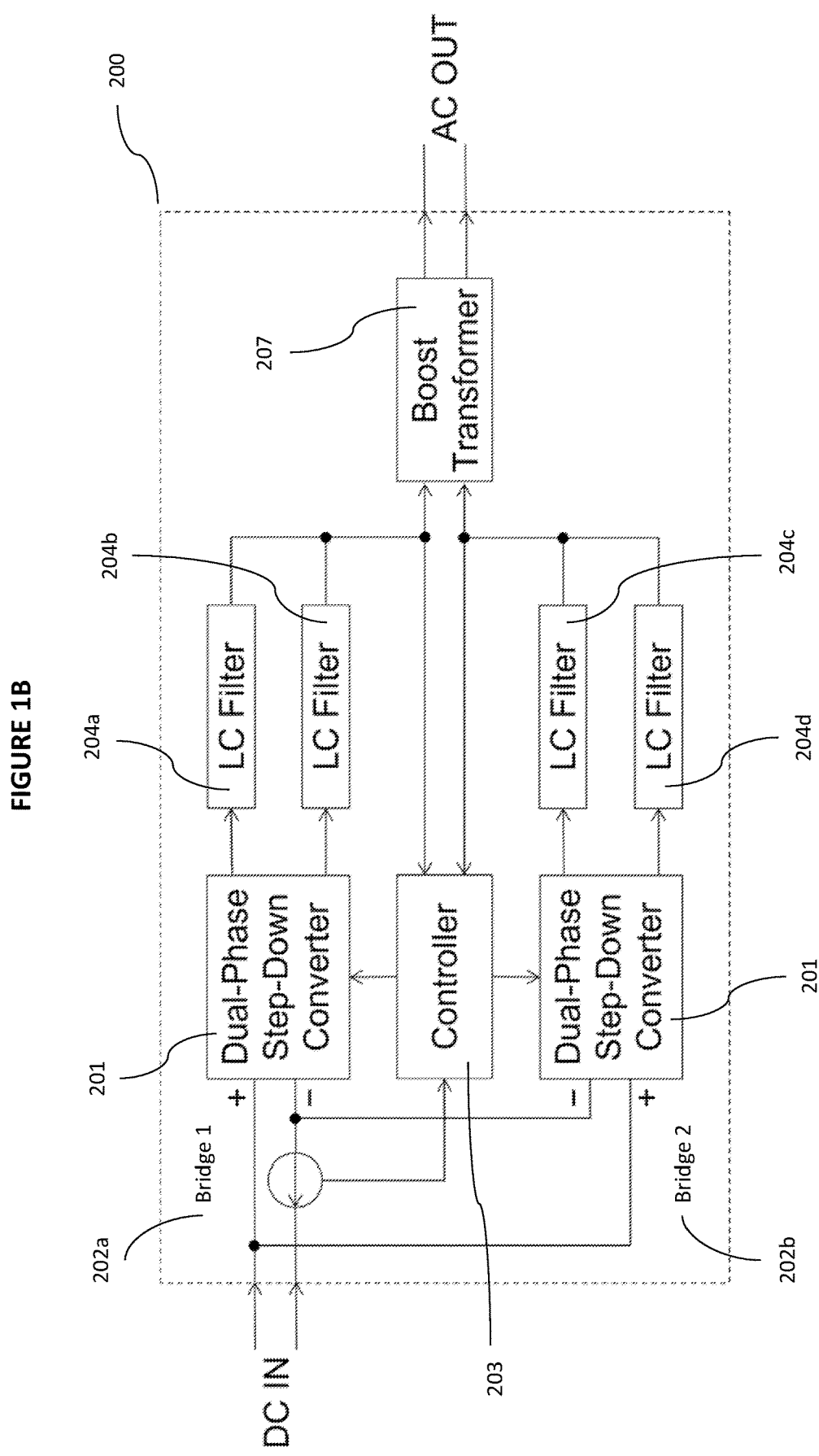
FIG. 1B illustrates a block diagram of a multi-phase unfolding bridge circuit, according to embodiments of the present disclosure.
Figure 1C:
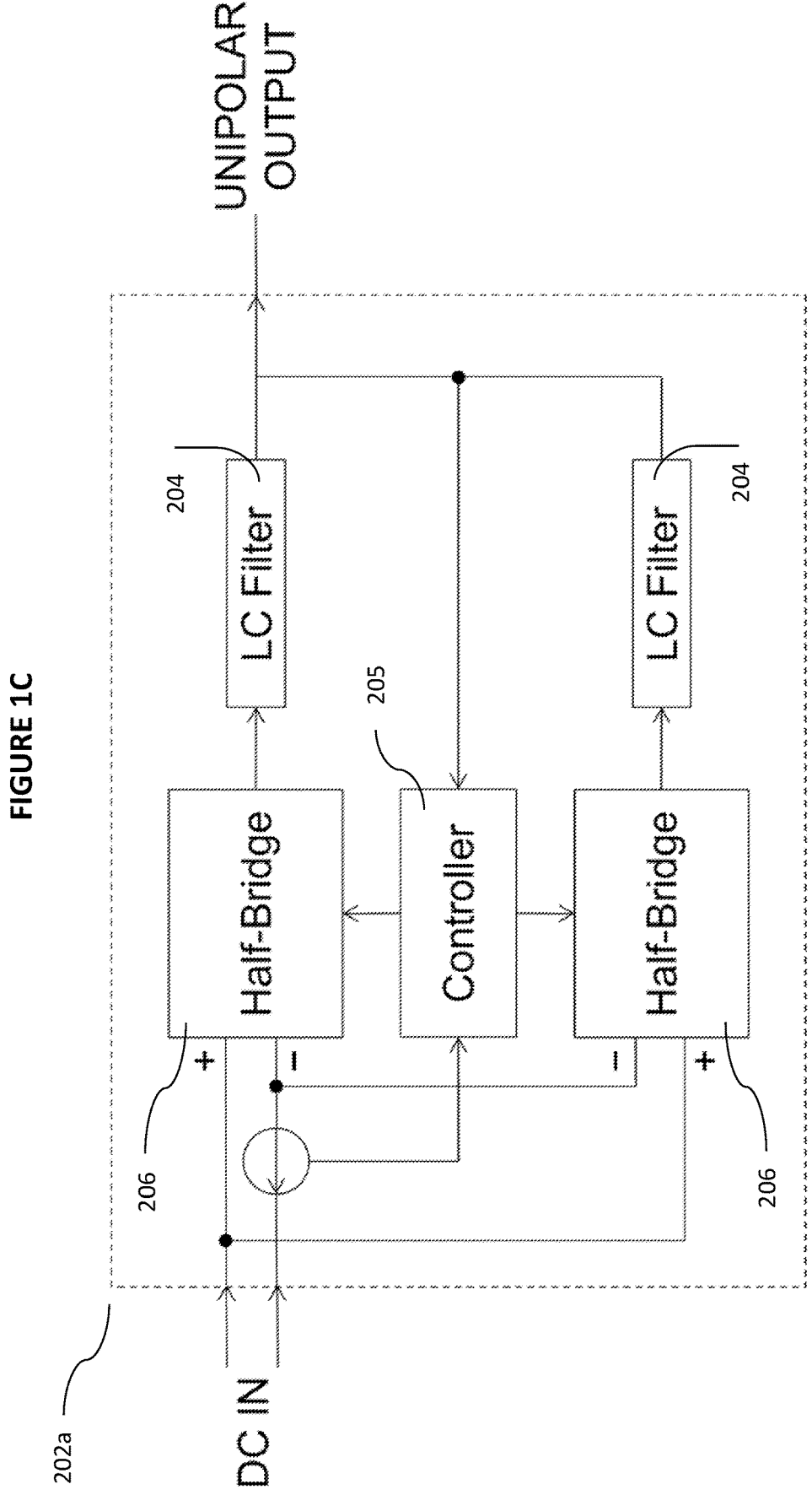
FIG. 1C illustrates a block diagram of a multi-phase unfolding bridge circuit comprising two half-bridges operating 180 degrees out of phase according to embodiments of the present disclosure.

The block diagrams in FIG. 1B and FIG. 1C demonstrate a dual-phase unfolding bridge inverter 200, and a dual-phase step-down converter 201. In some cases, the multi-phase unfolding bridge inverter can be implemented as a dual-phase unfolding bridge power stage that consists of two dual-phase step-down converters, two bridges, 202a, 202b. The dual-phase unfolding bridge includes a controller 203 with four pulse width modulators (PWM) signals, which can be standard PWMs or natural pulse-width modulators (nPWM) and wherein the output is amplified by a boost transformer 207. Referring to FIG. 1C. The bridge 202a has two LC filters 204a 204b, a bridge controller 205. It is important with any multi-phase switching system to closely match phase-to-phase voltage gain between them. Each of the following can introduce phase-to-phase voltage gain mismatch that will result in phase-to-phase output current mismatch: Attenuator gain, ramp and dead time mismatches. Phase-to-phase matching is accomplished through the half-bridges 206a 206b that interact with the bridge controller 205.

Each half of the unfolding bridge inverter consists of 2 half-bridges 206a 206b operating out of phase by 180 degrees as shown in FIG. 1C. For a switching frequency of 60 kHz, for example, this would yield a net switching frequency of 120 kHz, the net switching frequency doubles the ripple frequency of the filter capacitors, allowing for smaller values of capacitance for the equivalent ripple performance and for wider bandwidth in the voltage control loop, which translates to improved transient response to complex loads.

The examples in FIG. 1B and FIG. 1C demonstrates that in some embodiments of the present disclosure, each phase 206a 206b of the dual-phase unfolding bridge inverter 200 is operable at, for example 60 kHz, while yielding double the operating frequency of 120 KHz. This aspect provides the advantage that current ripple is canceled out at 50% duty-cycle and is reduced to that which would be present when operating a single-phase step-down converter at 120 kHz while simultaneously reducing switching losses in the half-bridges 202a 202b due to each bridge 202a 202b operating at only 60 KHz. Furthermore, an aspect of the disclosure is that the components can be scaled in the modulator filter 204 section to an economical size, as it is well known that in electronics, operating switching amplifiers at higher frequencies requires magnetic components of a smaller size and weight.

Figure 1D:
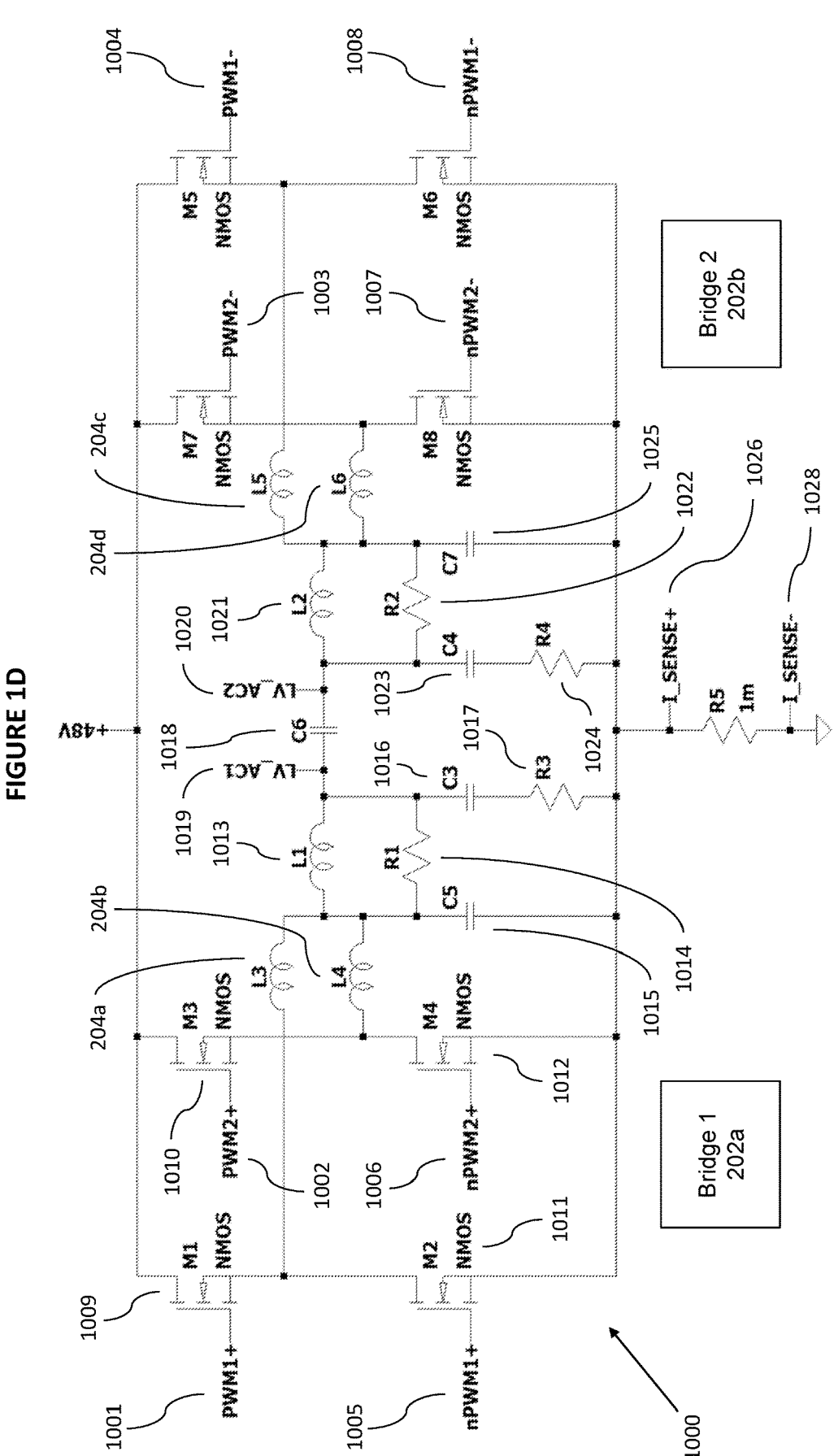
FIG. 1D illustrates an example electrical schematic of a multi-phase unfolding bridge circuit, according to embodiments of the present disclosure.

FIG. 1D illustrates an embodiment of a multi-phase unfolding bridge circuit 200 which as shown in the embodiment present in FIG. 1D, can be a dual-phase unfolding bridge circuit 1000, wherein the two individual dual-phase step-down converters 202a 202b and each associated phase can be seen. The two phases of each bridge are summed together through associated inductors 204a/204b and 204c/204d. This has the effect of lowering both input and output current ripple as well as decreasing load in each bridge on respective pairs of MOSFETs 1009/1010 and 1011/1012, thus distributing power handling across 4 MOSFETs in each bridge 202a 202b. It has a similar effect of paralleling the MOSFET pairs, without the drawbacks from the disadvantages of creating increased switching losses and Qrr effects that would result if the MOSFET pairs were actually paralleled.

The dual-phase step-down converter 201 can utilize voltage gain matching to ensure each phase 206a 206b provides half of the output current in voltage feedback mode, according to some embodiments. In some cases, the dual-phase step-down converter 201 utilizes current gain matching to ensure each phase 206a 206b provides half of the output current in cycle-by-cycle current limit mode.

In some cases, the differential output of the dual-phase unfolding bridge circuit 1000 200 filter has two complex poles, both of which are dampened by 1014, 1022, 1017 and 1024.

$$f_{LC1} \approx \frac{1}{2\pi \cdot \sqrt{\dfrac{(((L3\|L4 + L1) + ((L5\|L6) + L2)) \cdot}{(C6 + ((0.5 \cdot C4 + 0.7) \cdot C7))}}} = 6.4 \text{ kHz} \qquad (1)$$

$$f_{LC1} \approx \frac{1}{\left(2\pi \cdot \sqrt{\dfrac{(((204a\|204b) + 1013) \cdot (1018 + ((0.5 \cdot 1016 +}{0.7 \cdot 0.5)\|(0.5 \cdot 1023 + 0.7 \cdot 1025)))}}\right)} = 6.4 \text{ kHz}$$

$$f_{LC2} \approx \frac{1}{2\pi \cdot \sqrt{(L1\|L2\|L3 \cdot C5)}}$$

Where $f_{LC1}$ can be the frequency at 1019 and $f_{LC2}$ can be the frequency at 1020, in some cases. The voltage feedback uses a resistor divider to take feedback from 1019 and 1020 simultaneously. Given the symmetry of the dual-phase unfolding bridge circuit 1000 filter, and that only one dual-phase step-down converter 201 is active at a time, the passive output introduces a complex zero that compensates the active output complex pole, therefore capable of producing a virtual 120 kHz switching frequency when inclusive of each of the four (4) half-bridges, in some cases.

In some cases, the dual-phase unfolding bridge circuit 1000 can include a power stage, as shown in FIG. 1D. As shown in FIG. 1D, the dual-phase unfolding bridge can implement PWMs 1001 1002 1003 1004 and nPWMs 1005 1006 1007 1008 as power stage controllers 205. For example, in some embodiments, in a power stage configuration, the PWM 1001 1002 and nPWM 1005 1006 can be paired such that each is operated 180 degrees out of phase, which allows for, but is not limited to, cancellation of the inductor ripple current, attenuation of the capacitor ripple current, doubling the frequency of the capacitor ripple current, and doubling the sample frequency of the controller 205.

FIG. 2A demonstrates a DC Filter and Energy Storage Unit 134, 334 to receive the corrected signal. Referring to FIG. 2A the reserve DC Filter and Energy Storage Unit 334 receives a DC Bus 48V positive supply input 332, a DC Bus 48V negative supply return 331 and produces a status 330. The DC Filter and Energy Storage Unit 334 filters the 48V positive supply input 332 via a DC Filter Bulk Capacitor 335, wherein the energy storage has a low-current element 336 and a high-current element 337 that is modified by the DC filter and energy storage Controller 338.

In some cases, the DC filter and energy storage Controller 338 monitors the DC bus voltages 331 332 and the voltage drops of the low-current element 336 and high-current element 337 to determine at which point to enable operation of the high-current element 337. The DC filter and energy storage Controller 338 may include under-voltage lock-out (UVLO) monitoring to enable the high-current element 337 only after the DC bus has reached the UVLO enable threshold. The DC filter and energy storage Controller 338 may use, but is not limited to, a programmable time delay to enable the high-current element 337 after the DC Filter Bulk Capacitance 335 is charged.

Additionally, the DC filter and energy storage Controller 338 may generate a status signal to indicate that the high-current element 337 is enabled. The status signal may be of the open-collector/open-drain type to allow the logical OR of multiple status signals. In some instances, the status signal is used to enable the circuitry being powered once the high-current element 337 has been enabled. The DC filter and energy storage Controller 338 may undertake a soft-start sequence of the high-current element 337 to relax the switching energy requirements of the high-current element 337 and to soften the inrush current resulting from the transition from the low-current element 336 resistance to the high-current element 337 resistance.

The low-current element 336 may be, but is not limited to, any type of passive current limiting device, such as Negative Temperature Coefficient (NTC) or Positive Temperature Coefficient (PTC) resistor, NTC inrush current limiter or PTC resettable fuse. The low-current element 336 presents a current limited path to charge the DC Filter Bulk Capacitance 335. The resistance of the low-current element 336 determines the maximum charging current of the DC Filter Bulk Capacitance 335. The low-current element 336 should be sized to handle the energy required to charge the DC Filter Bulk Capacitance 335.

$$E_{bulk} = \left(\frac{1}{2}\right)C_{bulk} \cdot V_{bus}^2$$

The capacitor energy is $\frac{1}{2}(C)V^2$, capacitance is 10 mF, and voltage is 48V DC. The charging current follows an exponentially decaying curve with time constant determined by the low-current element 336 resistance (10Ω) and the DC Filter Bulk Capacitance 335.

$$I_{bulk} = (V_{bus}/R_{low}) \cdot e^{[-t/(R_{low} \cdot C_{bulk})]}$$

With the current circuit, the capacitor soft-start current is on the order of 4.8 A peak and a time constant of 0.1 s. In some embodiments of present disclosure, the high-current element 337 may be, but is not limited to, any type of low-impedance switch, such as mechanical relay, solid-state switch, or discrete n-channel MOSFET transistor. The high-current element 337 only carries the AC current or ripple current of the DC BUS; as such, the high-current element 337 does not present a source of continuous DC Resistance (DCR) voltage drop, DCR power losses and does not need to be sized in relation to the continuous DC current draw of the circuitry connected to the DC Bus.

The DC filter and energy storage Controller 338 may generate a status signal to indicate that the high-current element 337 is enabled. The status signal may be of the open-collector/open-drain type to allow the logical Operator (OR) of multiple status signals. The status signal may be used to enable the circuitry being powered after the high-current element 337 has been enabled.

The characteristics required to charge a DC Filter Bulk Capacitance 335 bank may exceed the full load characteristics of the PFC 133 supply. The power source requirements are exacerbated with hot-swap capable devices. For input fuse protected devices the charge current of a DC Filter Bulk Capacitance 335 bank may result in blown fuses. This presents a problem as the fuse rating is determined by the charge current of the DC Filter Bulk Capacitance 335 bank rather than the full load characteristics of the circuit being powered. The fuse rating requirements are again exacerbated with hot-swap capable devices. For hiccup current limit protected power sources the DC Filter Bulk Capacitance 335 may impede the power supply from starting.

A soft-start circuit 601 may be implemented in some embodiments to charge the DC Filter Bulk Capacitance 335. In some embodiments the soft-start circuit causes the low-current element 337 to relax the switching energy requirements of the high-current element 337 and to soften the inrush current resulting from the transition from the low-current element 336 resistance to the high-current element 337 resistance. A soft-start circuit may be configured to control power surges. In some cases, the soft-start circuit includes a positive input and negative return DC bus, a DC filter and energy storage Controller 338, a high-current element 337, a low-current element 336, and a DC filter bulk capacitance 335.

Figure 3A:
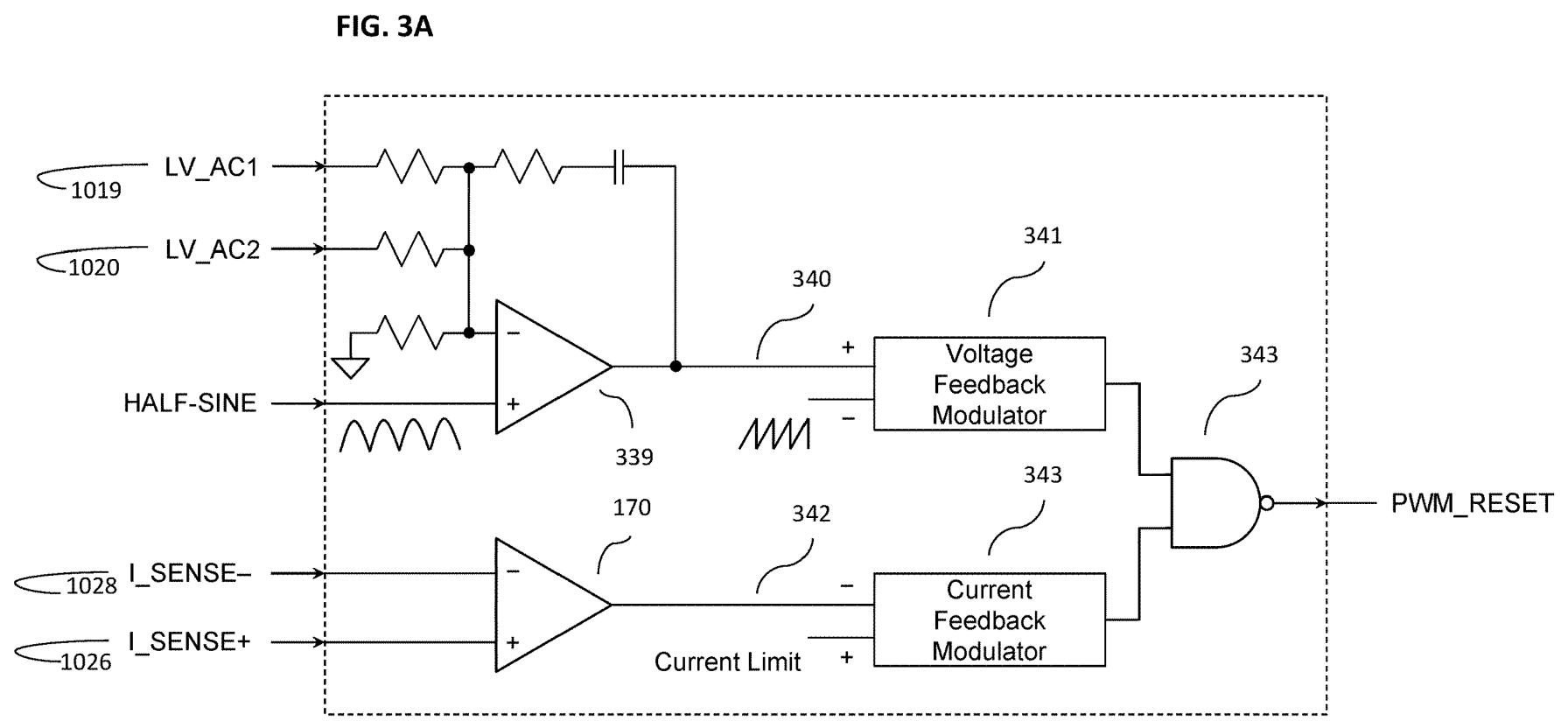

FIG. 3A illustrates a block diagram of a dual-phase unfolding bridge circuit 1000 with voltage feedback with cycle-by-cycle current limit PWM modulator 200 that includes both voltage and current sensing, according to some embodiments of the present disclosure. Output voltage of the dual-phase step-down converter 110 201 can be sensed at LV_AC1 1019 and LV_AC2 1020 then scaled and compared to the half-sine 50 or 60 Hz precision reference signal produced by the DAC 180 via an error amplifier 339. The voltage feedback amplifier 339 generates an output voltage 340 that is fed into the voltage feedback modulator 341. In some cases the voltage feedback modulator 341 includes a comparator measuring either high or low depending on whether the ramp has exceeded the output of the error amplifier 339. The CSA 170 generates an output voltage 342 proportional to the output current of the dual-phase unfolding bridge that is fed into the current feedback modulator 343. In some cases, the current feedback modulator 343 includes a comparator measuring either high or low depending on whether the output of the CSA 170 has exceeded the current limit threshold. The outputs of the voltage feedback modulator 341 and the current feedback modulator 343 are fed to a NAND gate 344. The NAND gate 344 can be configured to reset the PWMs of the controller 230.

Figure 3B:
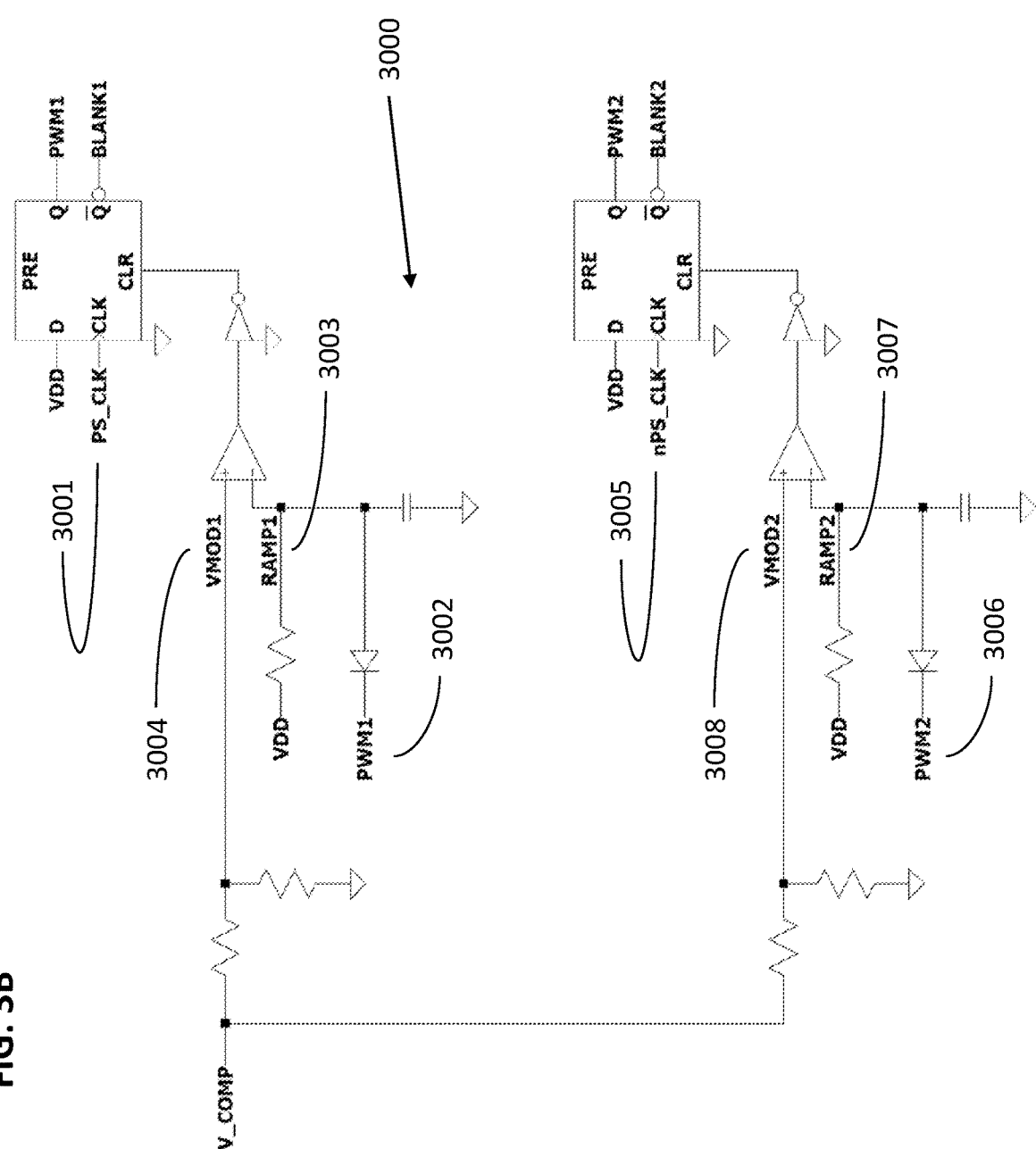
FIG. 3B illustrates an example electrical schematic of a dual-phase unfolding bridge PWM modulator circuit, according to embodiments of the present disclosure.

FIG. 3B illustrates an example of a circuit implementation of a dual-phase unfolding bridge voltage feedback PWM modulator 3000. In some embodiments, the modulation cycles include a switching cycle phase 1, and a switching cycle phase 2, both at 60 kHz, achieving a virtual switching frequency of 120 kHz. The beginning of a switching cycle of phase 1 starts with a rising edge of PS_CLK 3001, which sets PWM1 3002 and starts the ramp voltage RAMP1 3003. The switching cycle ends when the ramp voltage RAMP1 3003 is higher than VMOD1 3004 which resets PWM1 3002 and discharges the ramp voltage RAMP1 3003. The beginning of a switching cycle for phase 2 starts with a rising edge of nPS_CLK 3005, which sets PWM2 3006 and starts the ramp voltage RAMP2 3007. The switching cycle ends when the ramp voltage RAMP2 3007 is higher than VMOD2 3008 which resets PWM2 3006 and discharges the ramp voltage RAMP2 3007.

Figure 3C:
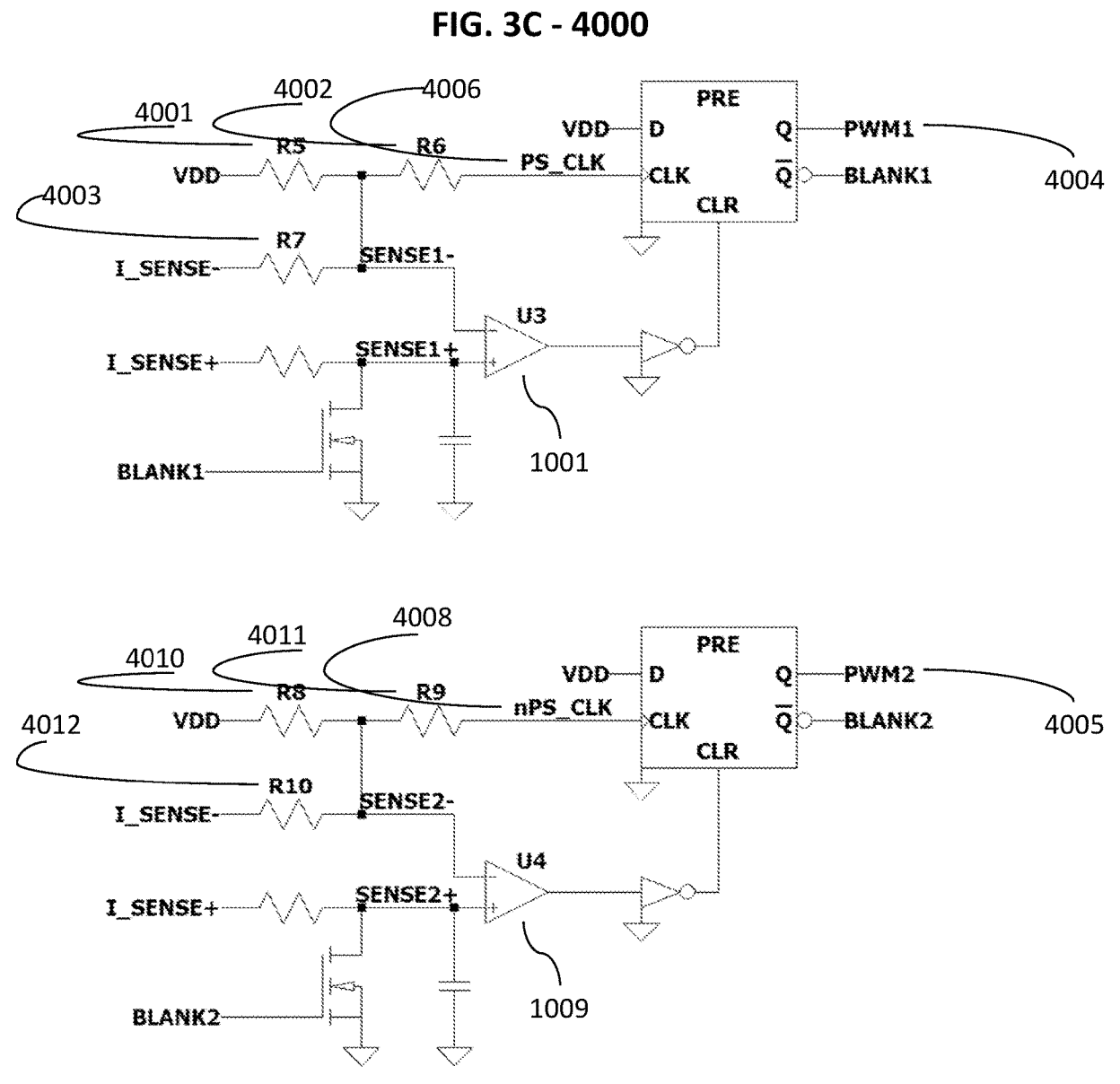

FIG. 3C illustrates an example of a circuit implementation of a dual-phase unfolding bridge current feedback PWM modulator 4000, which adds cycle-by-cycle current limit protection to the dual-phase unfolding bridge circuit 1000 200. The current limit thresholds can be set by R5 4001, R6 4002 and R7 4003 for phase 1 206a and R8 4010, R9 4011 and R10 4012 for phase 2 206b. In some embodiments, the current limit is raised by approximately 10% for the phase with the power supply clock high in cases when duty-cycles higher than 50%, and both PWM1 and PWM2 are set, to assure that the phase with the power supply clock low ends the switching cycle first. In embodiments with duty-cycles lower than 50%, the cycle-by-cycle current limit of each phase is 71 A. In some cases, where only PWM1 4004 or PWM2 4005 are set at one time, the output current is roughly twice the cycle-by-cycle current limit, which in some embodiments is 142 A minus half of the output capacitor ripple current. For duty-cycles higher than 50%, the cycle-by-cycle current limit of the phase with the power supply clock low is 64.7 A. Given PWM1 4004 and PWM2 4005 are set at the end of each switching cycle, the output current is the same as the cycle-by-cycle current limit, or 64.7 A minus half of the output capacitor ripple current. The beginning of a switching cycle of phase 1 starts with a rising edge of PS_CLK 4006, which sets PWM1 4004 and ends current sense blanking for U3 4007. The switching cycle ends when the current sense voltage is higher than the current limit threshold voltage set by R5 4001, R6 4002 and R7 4003, which resets PWM1 4004 and enables current sense blanking for U3 4003. The beginning of a switching cycle of phase 2 starts with a rising edge of nPS_CLK 4008, which sets PWM2 4005 and ends current sense blanking for U4 4009. The switching cycle ends when the current sense voltage is higher than the current limit threshold voltage set by R8 4010, R9 4011 and R10 4012, which resets PWM2 4005 and enables current sense blanking for U4 4009.

Figure 3D:
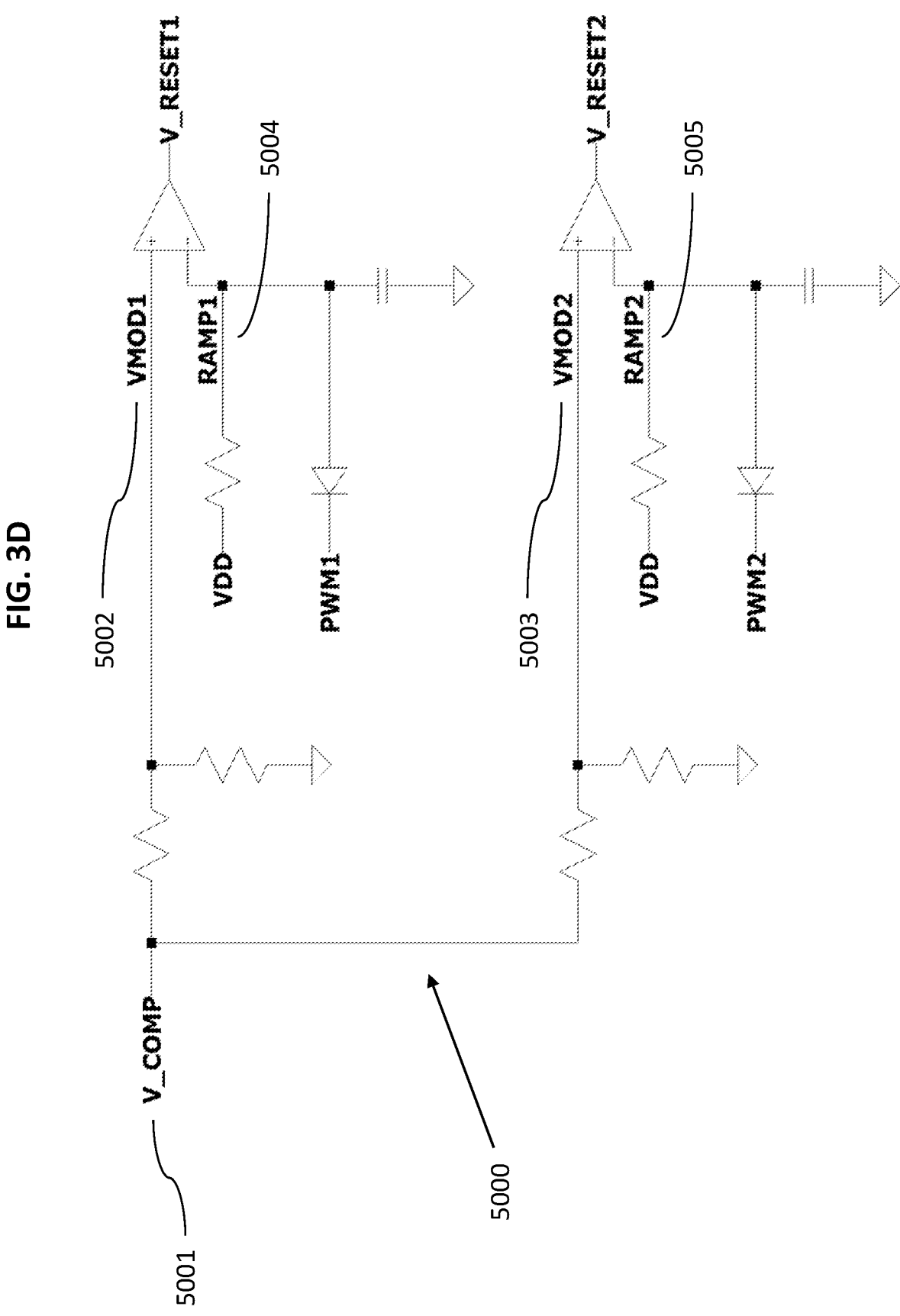
FIG. 3D illustrates an example electrical schematic of a dual-phase unfolding bridge voltage feedback with cycle-by-cycle current limit PWM modulator aggregate circuit, according to embodiments of the present disclosure.

FIG. 3D illustrates an example of a circuit implementation of a dual-phase unfolding bridge PWM modulator 200 1000, including both voltage feedback and cycle-by-cycle current limit protection embodied in an isolated feedback peak voltage control circuit 5000. The dual-phase step-down converter 201 described relies on voltage gain matching to ensure each phase provides half of the output current in voltage feedback mode. A half-bridge 206a 206b operating in resonant mode, where the inductor current drives the switching node during the dead time, presents a relatively high source impedance when compared to the half-bridge RdsON and inductor DCR. A half-bridge operating in continuous conduction mode, where the inductor current does not reach zero throughout the switching cycle, presents a low source impedance because the body diode of the synchronous MOSFET conducts the inductor current during the dead time, and the high-side MOSFET is hard switched when the dead time expires. Each of the following can introduce phase-to-phase voltage gain mismatch that will result in phase-to-phase output current mismatch: VMOD1 5002 to VMOD2 5003 attenuator gain mismatch, RAMP1

5004 to RAMP2 5005 time constant mismatch, and/or Half-bridge dead time mismatch.

Figure 4A:
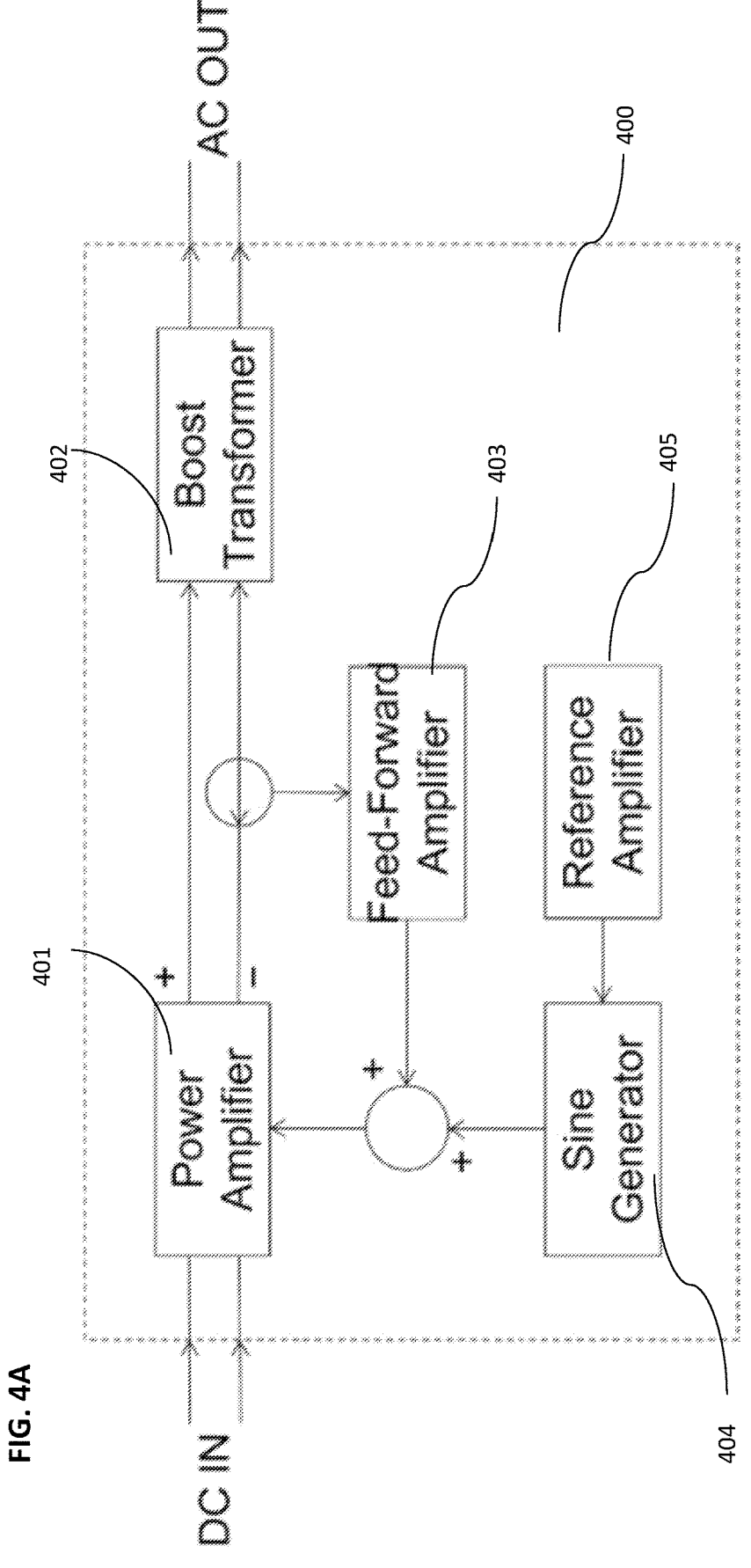
FIG. 4A illustrates a block diagram for an apparatus featuring a feed-forward compensation circuit with compensation, according to embodiments of the present disclosure.

FIG. 4A demonstrates an apparatus for compensating for an electrical signal via a current feed-forward compensation circuit 400 is described. The feed-forward compensation circuit 400 comprises at least a power amplifier 401, a boost transformer 402, and feed-forward amplifier 403, a sine generator 404, and a reference amplifier 405. The feed-forward compensation circuit 400 is configured so that it adds to the power amplifier 401 output voltage in proportion and equal sign to its output current. The feed-forward compensation circuit 400 operation describes a positive feedback loop, which makes the output impedance of the power amplifier 401 negative to partially compensate for the boost transformer 402 impedance, resulting in substantially improved transient response measured at the boost transformer 402 output. The DC gain of the feed-forward compensation circuit 400 feedback sets the real part of the negative output impedance added to the power amplifier 401. In some aspects, the current feed-forward compensation circuit 400 feedback includes a zero-pole pair to the feed-forward compensation circuit 400 such that the power amplifier negative output impedance has a negative inductive element with an upper frequency boundary.

Figure 4B:
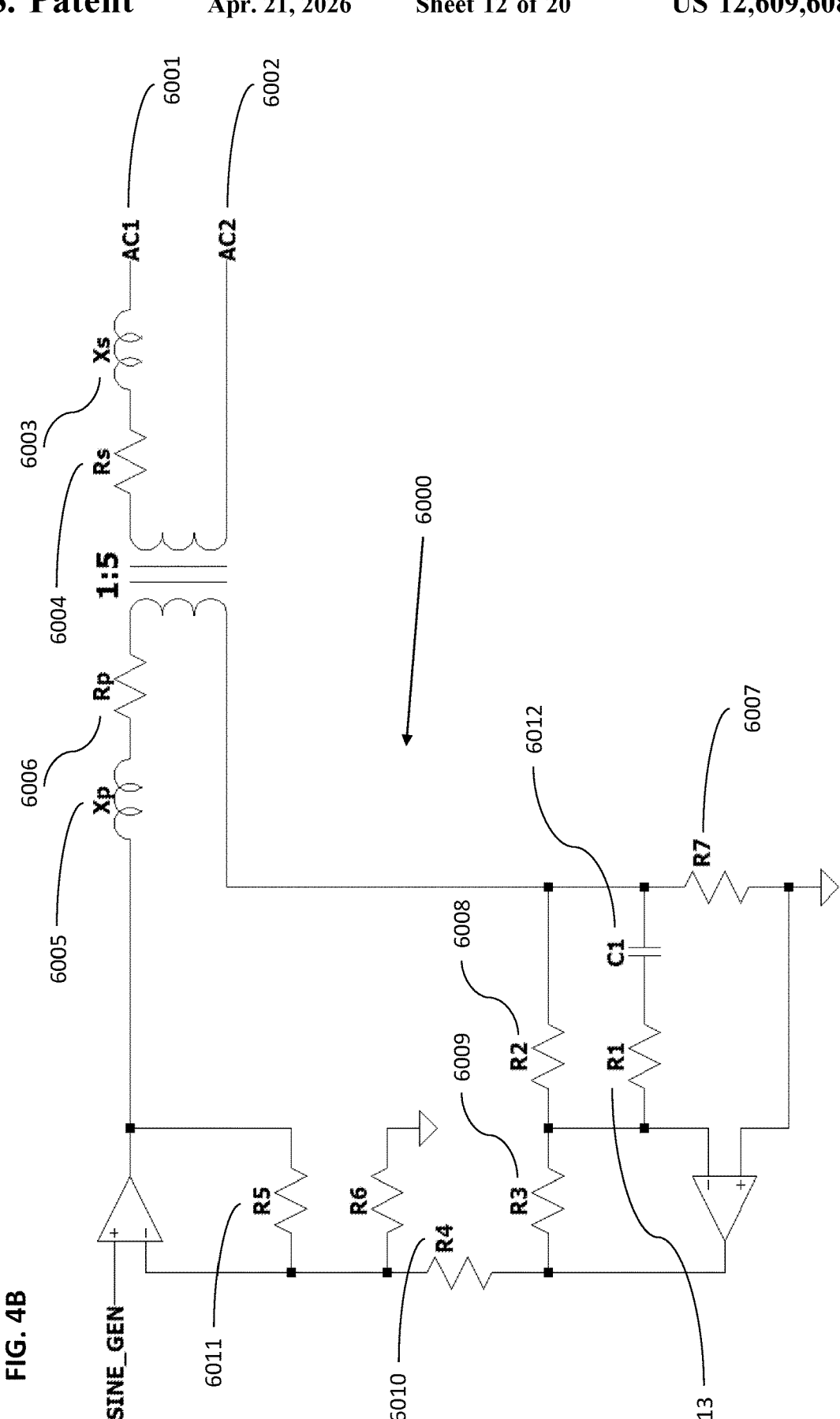
FIG. 4B illustrates an example electrical schematic of a feed-forward compensation circuit with compensation for copper losses, according to embodiments of the present disclosure.

FIG. 4B demonstrates an example of a current feed-forward compensation circuit 400 configured to compensate for copper losses 6000. FIG. 4D and FIG. 4E demonstrate the effect of different configurations of the feed-forward compensation circuit 400 graphically on a Bode plot. Referring to FIG. 4B, when the effect of the feed-forward compensation is removed, the output impedance measured across AC1 6001 to AC2 6002 is comprised of the secondary winding impedance (Xs 6003+Rs 6004) of the boost transformer and the primary winding impedance (Xp 6005+Rp 6006) of the boost transformer plus the current sense resistance R7 6007 reflected to the transformer secondary.

$$Z_{out} = Z_s + (Z_p + R_7) \cdot \left(\frac{Ns}{Np}\right)^2 = (525 \ m\Omega + 350 \ \mu H)$$

Where $Z_{out}$ is output impedance, $Z_s$ is impedance in the secondary coil, $Z_P$ is impedance in the primary coil, $N_S$ is the number of turns in the secondary coil, and $N_P$ is the number of turns in the primary coil. The output impedance has a zero at $f_c = 1/(2\pi \cdot \tau)$ determined by the RL time constant ($\tau = L/R$). The cut-off frequency of the output impedance determines the frequency at which the output impedance transitions from resistive to inductive. The cut-off frequency of the output impedance measured across AC1 6001 to AC2 6002 when the effect of the feed-forward compensation is removed is 239 Hz.

The feed-forward compensation amplifier adds to the output voltage of the power amplifier in proportion and equal sign of its output current. This operation describes positive feedback, which in this instance makes the output impedance of the power amplifier negative.

$$AMP \ V_{out} = AMP \ I_{out} \cdot R_7 \cdot \left(-\frac{R_3}{R_2}\right) \cdot \left(-\frac{R_5}{R_4}\right)$$

$$AMP \ R_{out} = \left(\frac{AMP \ V_{out}}{AMP \ I_{out}}\right) = -20 \ m\Omega$$

Where AMP $V_{out}$ is the amplifier output voltage, AMP $I_{out}$ is the amplifier output current, and AMP $R_{out}$ is the output impedance measured across the amplifier output. When the DC effect of the feed-forward compensation is added, the output impedance measured across AC1 6001 to AC2 6002 previously calculated (formula 5, see supra) is adjusted by the power amplifier negative output impedance reflected to the transformer secondary.

$$Z_{out} = Z_S + (Z_P + R_7 + AMP\ R_{out}) \cdot \left(\frac{N_S}{N_P}\right)^2 = (25\ m\Omega + 350\ \mu H)$$

In some cases, given the positive feedback introduced by the feed-forward compensation circuit 400, it's important to ensure that the feedback gain introduced by the feed-forward amplifier is less than one, which can be accomplished by ensuring that the real part of the output impedance measured across AC1 6001 to AC2 6002 is positive as shown by formulas 6-8, see supra. Because the inductive part of the output impedance measured across AC1 6001 to AC2 6002 does not change when the DC effect of the feed-forward compensation is added the cut-off frequency of the output impedance is reduced to 11.4 Hz. For 60 Hz power transmission the DC effect of the feed-forward compensation will lower output impedance measured across AC1 6001 to AC2 6002 from 0.542Ω down to 0.132Ω, which represents an output impedance reduction by a factor of 4. R1 6013 C1 6012 introduces a zero-pole pair to the feed-forward compensation.

Where $f_z$ is the zero cut-off frequency, or zero location on a Bode plot, the zero $$f_z = \frac{1}{(2\pi \cdot R_2 \cdot C_1)}$$

adds a negative inductance element to the power amplifier output impedance.

Where $f_p$ is the pole cut-off frequency, or pole location on a Bode plot, the pole $$f_p = \frac{1}{(2\pi \cdot R_1 \cdot C_1)}$$

sets an upper frequency boundary to the negative inductance element added to the power amplifier output impedance. In some embodiments, the DC and AC effects of the feed-forward compensation will lower output impedance measured across AC1 6001 to AC2 6002 from 0.542Ω down to 0.027Ω under 60 Hz power transmission, representing an output impedance reduction by a factor of 20.

Figure 4C:
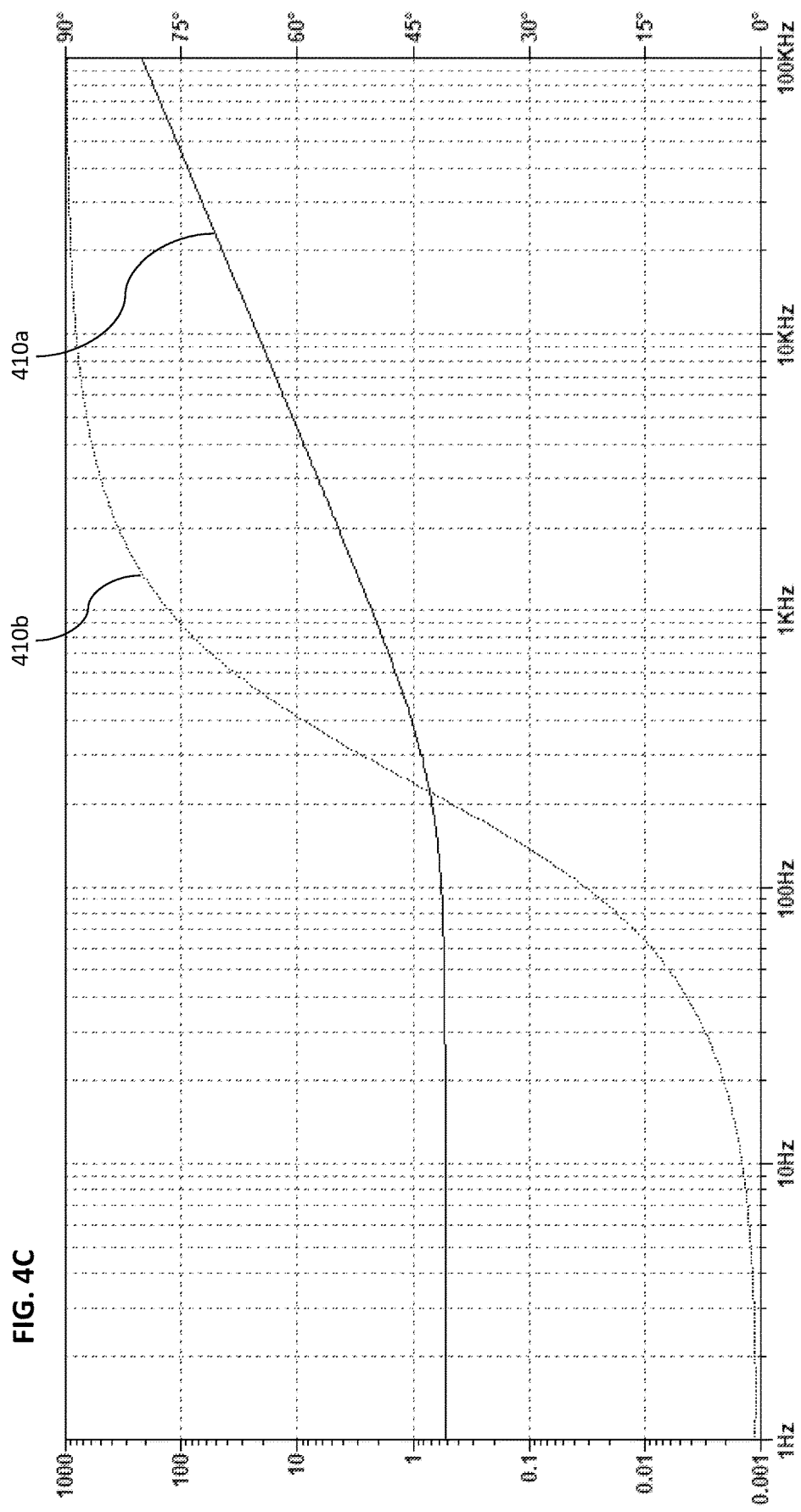
FIG. 4C is a graph illustrating the effects of a feed-forward compensation circuit on output impedance.
Figure 4D:
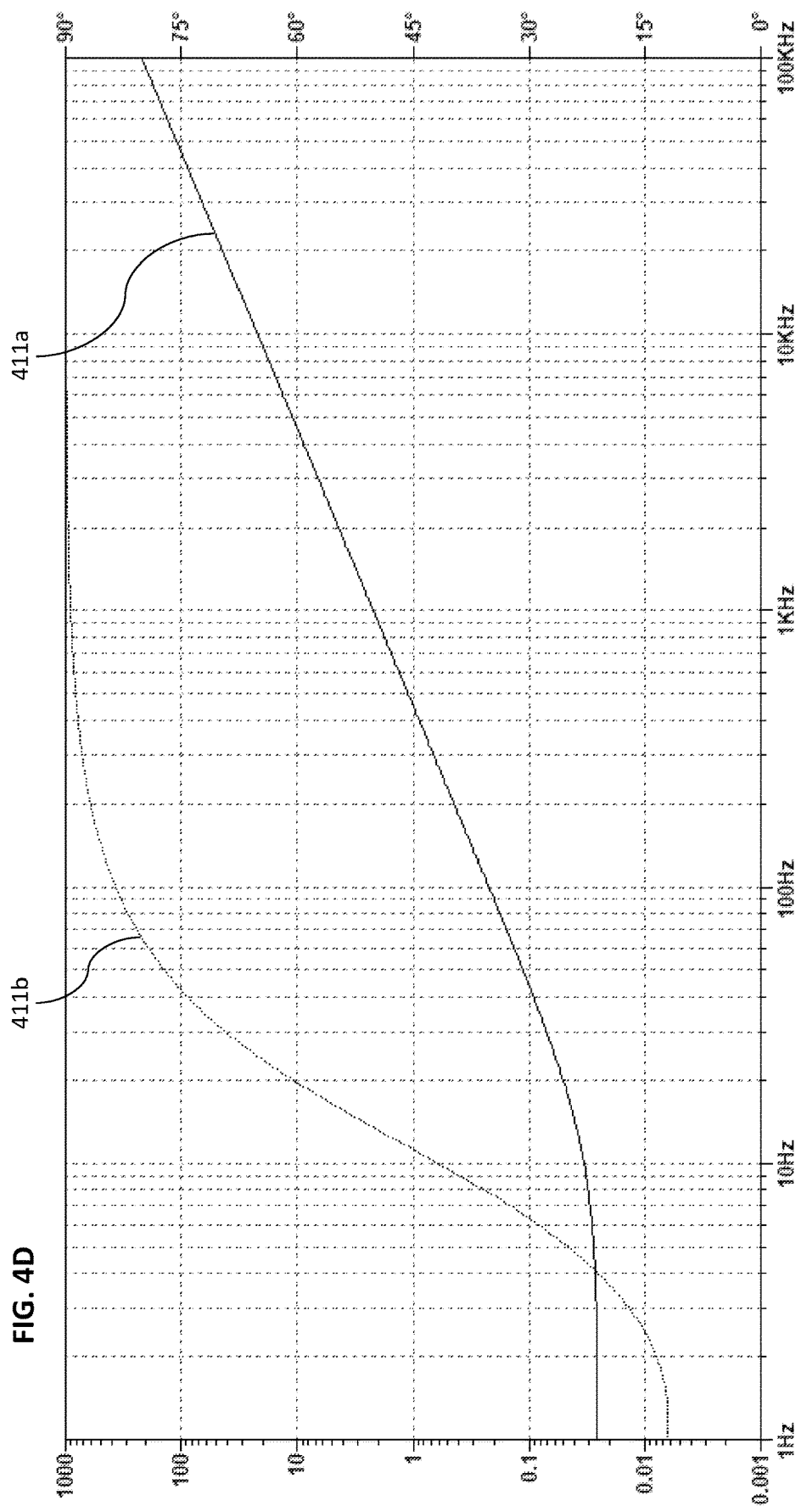
FIG. 4D is a graph illustrating the effects of a feed-forward compensation circuit on output impedance.
Figure 4E:
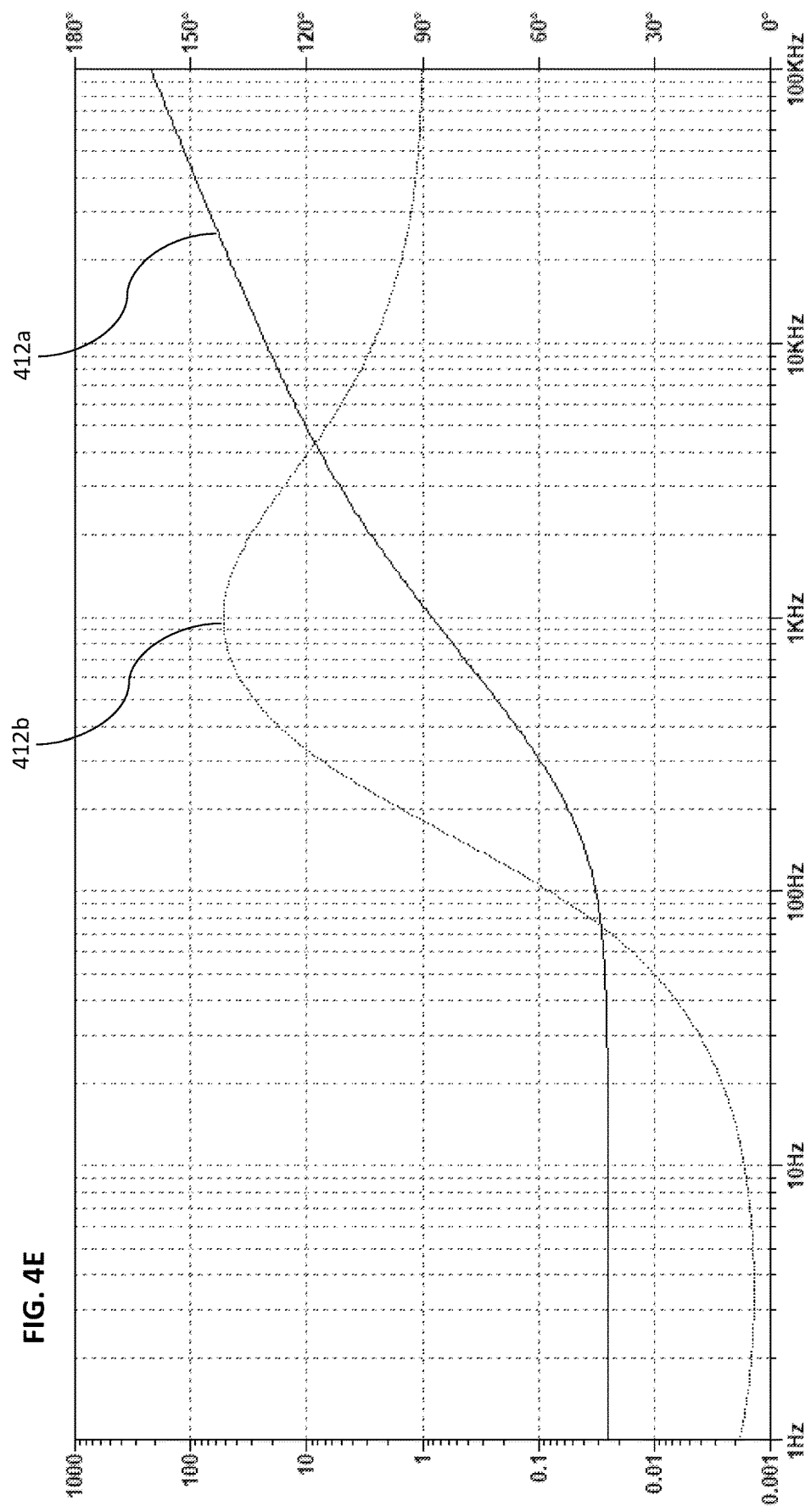
FIG. 4E is a graph illustrating the effects of a feed-forward compensation circuit on output impedance.

FIG. 4C denotes a graph demonstrating standard use wherein no feed-forward circuit is employed. The graph illustrates the output impedance measured across AC1 6001 to AC2 6002 of the feed-forward circuit 400 disclosed in FIG. 4B, when the DC effect of the feed-forward compensation is removed 410 and where the solid line 410*a* represents magnitude of impedance, the dotted line 410*b* represents phase of output impedance. Under standard use conditions wherein no feed-forward compensation circuit is employed, note that ~0.54 ohm is effective output Z down to DC.

FIG. 4D denotes a graph demonstrating feed-forward compensation without the zero-pole pair. The graph illustrates the output impedance measured across AC1 6001 to AC2 6002 of the feed-forward circuit 400 disclosed in FIG.

4B, when the DC effect of the feed-forward compensation is added 411 and where the solid line 411*a* represents magnitude of impedance, the dotted line 411*b* represents phase of output impedance. Using feed-forward without the zero-pole pair, low-frequency output Z improves to ~0.025 ohms down to DC. Moderate transient improvements are observable at 50/60 Hz.

FIG. 4E denotes a graph demonstrating feed-forward compensation with the zero-pole pair. The graph illustrates the output impedance measured across AC1 6001 to AC2 6002 when the DC and AC effects of the feed-forward compensation are added 412 and where the solid line 412*a* represents magnitude of impedance, the dotted line 412*b* represents phase of output impedance. For 60 Hz power transmission the DC and AC effects of the feed-forward compensation will lower output impedance measured across AC1 6001 to AC2 6002 from 0.542Ω down to 0.027Ω, which represents an output impedance reduction by a factor of 20. Compared to the outputs of FIG. 4C and FIG. 4D, the data shown by the graph in FIG. 4E using feed-forward with the zero-pole pair represents significant transient improvements at 50/60 Hz.

Figure 5A:
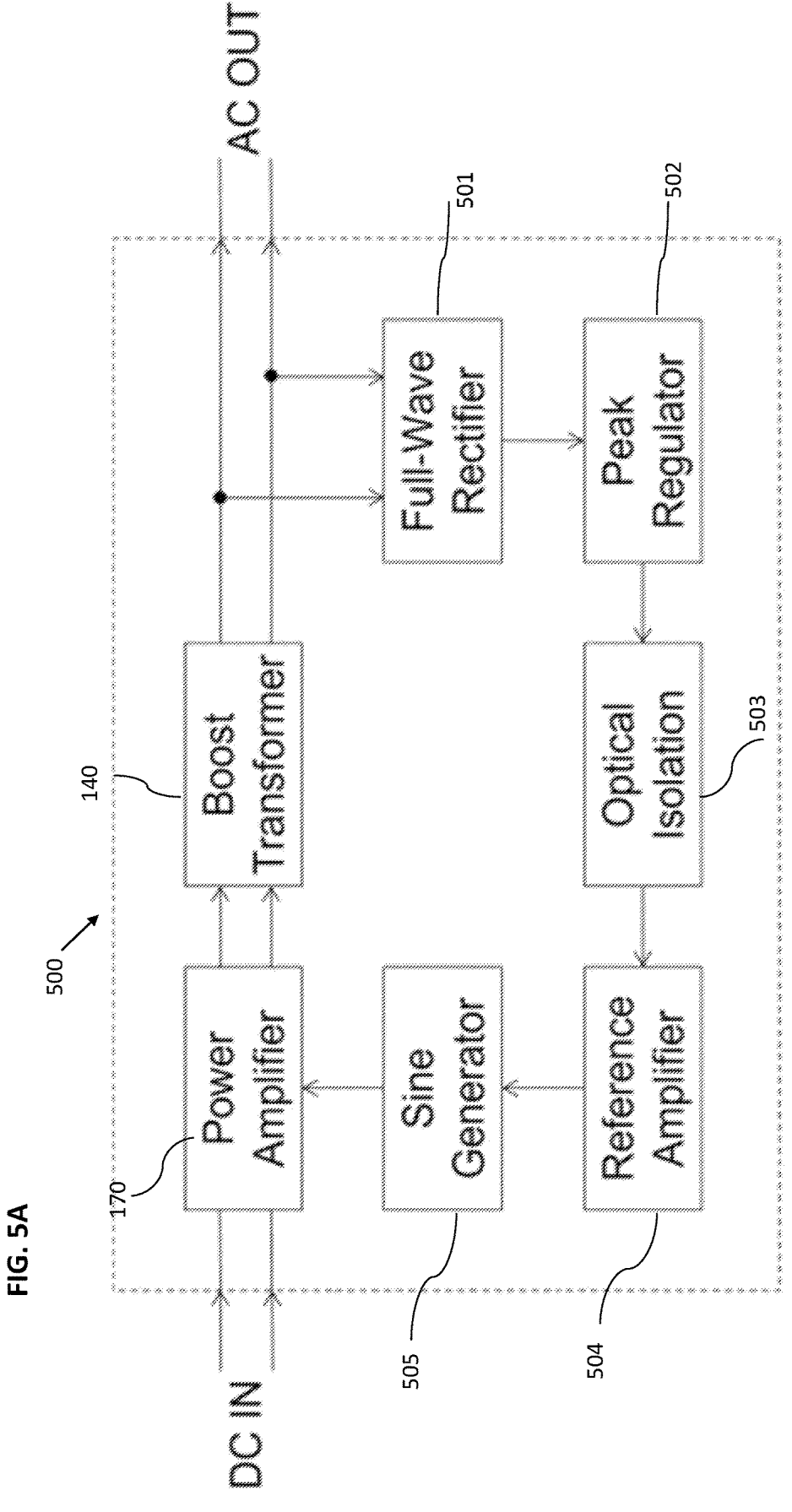
FIG. 5A illustrates a block diagram of an isolated feedback loop regulator circuit, according to embodiments of the present disclosure.

FIG. 5A demonstrates an isolated feedback peak voltage control circuit 500, 150 configured to filter the first output AC signal via the secondary side of the isolation transformer and return a feedback signal to the first side of the isolation transformer. As used herein "safety isolated feedback block" and isolated feedback peak voltage control circuit" are used interchangeably and commonly refer to embodiments as described in the present disclosure. In some embodiments the isolated feedback and voltage control circuit 500 comprises a full-wave rectifier 501, a peak regulator 502, optical isolation 503, a reference amplifier 504, and involves the sine generator 505. A feedback loop is configured to receive the output AC signal and deliver a rectified version of the output via the full wave rectifier 501 which is configured to receive the output AC signals, a peak regulator 502 which is configured to receive an output from the full-wave rectifier 501, an optical isolator 503 which is configured to receive an output from the peak regulator 502, a reference amplifier 504 which is configured to receive an output from the optical isolation 503 and a sine generator 505 which is configured to receive an output from the reference amplifier 504 and deliver a signal to the dual-phase unfolding bridge circuit 200. Thus if the output of the PVFC 100 was reduced, the feedback will result in an increase in output from the half-sine generator, which in turn will result in higher output from the dual-phase unfolding bridge circuit 200, resulting in higher AC signal applied to the output isolation boost transformer 140, in order to compensate for the reduction in output.

Figure 5B:
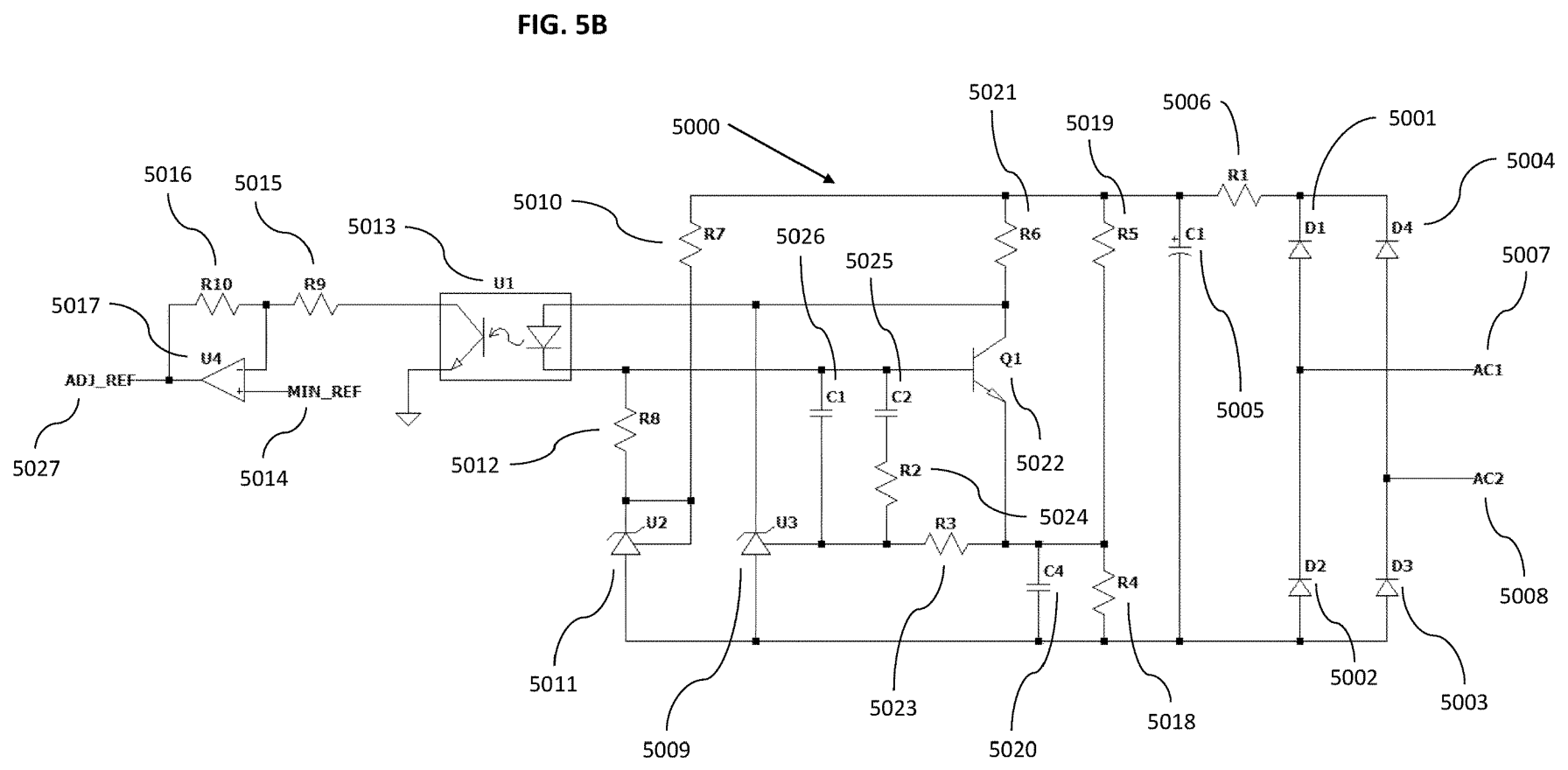

FIG. 5B demonstrates an embodiment of an isolated feedback peak voltage control unit that may be modified to include a soft-start circuit. The isolated feedback peak voltage control circuit 5000 may include an isolated feedback loop regulator circuit that can include a full-wave rectifier and low-pass filter, comprised of diodes D1 5001, D2 5002, D3 5003, D4 5004, and resistance R1 5006 and capacitance C1 5005, respectively, for converting the AC output (AC1 5007-AC2 5008) from the isolation transformer secondary side to DC in order to compare it to a stable DC reference shunt regulator U3 5009, and through R7 5010, U2 5011, R8 5012, and U1 5013 providing a compensation signal that is then isolated and used to modify the amplitude of the DAC output circuit, in turn modifying the half-sine drive signal applied to the dual-phase unfolding bridge circuit 1000. In such an embodiment, the output AC voltage remains highly stable over the specified range of output power it is intended to provide. The minimum peak output voltage occurs when the opto-coupler output transistor is in the cut-off region. The maximum peak output voltage occurs when the opto-coupler output transistor is in the saturation region.

$$AC_{pk\_min} = PA_{gain} \cdot MIN\_{REF}$$

Where, in some cases, when the AC voltage is higher than the closed loop peak regulation voltage, the shunt regulator U3 5009 operates in the saturation region, which starves the current to the input of an opto-coupler U1 5013, which in turn causes the output transistor of the opto-coupler U1 5013 to operate in the cut-off region, which in turn lowers the AC peak voltage to its minimum.

$$AC_{pk\_max} = PA_{gain} \cdot MIN\_{REF} \cdot \left(1 + \frac{R_{10}}{R_9}\right)$$

Where, in some cases, when the AC voltage is lower than the closed loop peak regulation voltage, the shunt regulator U3 5009 operates in the cut-off region, which allows maximum current to the input of an opto-coupler U1 5013, which in turn causes the output transistor of the opto-coupler U1 5013 to operate in the saturation region, which in turn increases the AC peak voltage to its maximum.

In some cases, the operation described in the preceding paragraphs describes a negative feedback control system; as such, if the AC peak regulation voltage falls within the AC peak regulation range, the control system will operate in the linear region and will regulate the peak voltage of the AC waveform across AC1 5007 to AC2 5008.

In some cases, the full-wave rectifier formed by D1 5001, D2 5002, D3 5003, D4 5004 and the low-pass filter formed by R1 5006 and C1 5005, will peak rectify the AC waveform and filter to a DC voltage. In this case, the rectified voltage has AC ripple determined by the capacitance of C1 5005 and the quiescent current drawn by the isolated circuitry. R1 5006 limits the peak current onto C1 5005 by forming a low-pass filter with a time constant of 1 ms.

In some cases, for a sine wave input the peak rectifier DC voltage is approximately equal to the rms voltage of the AC waveform times $\sqrt{2}$ minus two diode drops.

In some cases, the AC peak regulation setpoint is determined by the feedback voltage of the shunt regulator U3 5009 and the feedback resistors R4 and R5, but is slightly higher than the ideal AC peak regulation setpoint due to the low-pass filter formed by R1 and C1.

$$AC_{pk\_reg} = V_{fb} \cdot \left(1 + \frac{R_5}{R_4}\right)$$

In some cases, The low-pass filter formed by the source impedance of the feedback resistors R5 5019 and R4 5018, and C4 5020 create a low-pass filter that attenuates the rectifier voltage AC ripple and introduces a pole to the feedback.

In some cases, type I compensation is used to stabilize the control system. The compensation voltage is the opto-coupler input current measured across R8 5012. This compensation method prevents the non-linear forward voltage of the opto-coupler U1 5013 input from integrating an error across the compensation capacitance; furthermore, the compensation voltage is linear to the opto-coupler U1 5013 input current, rather than logarithmic to the opto-coupler U1 5013 input current, which would be the case if the compensation was connected to the anode of the opto-coupler U1 5013 input and R8 5012 replaced with a short circuit.

Figure 7:
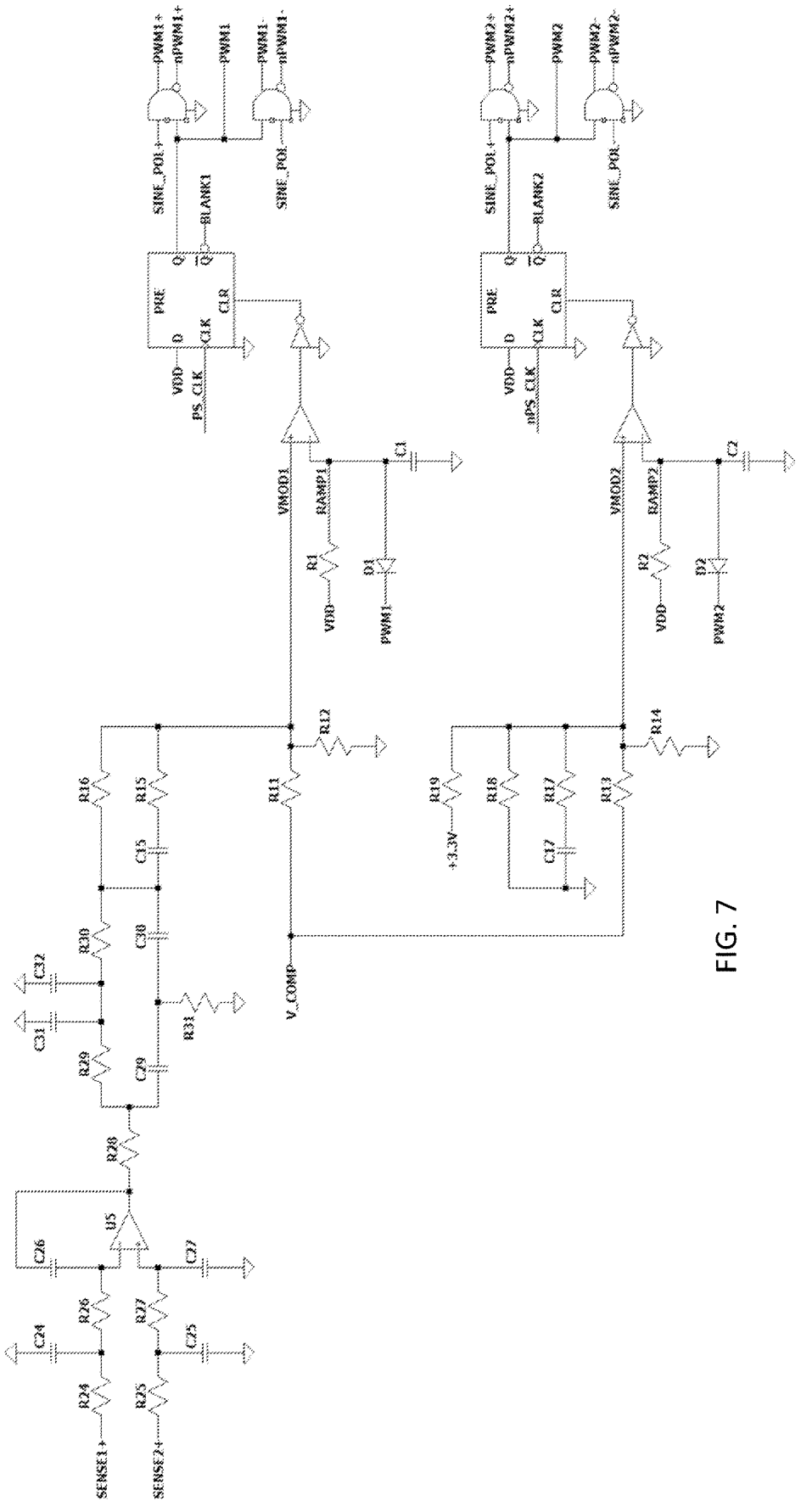
FIG. 7 illustrates an example electrical schematic of a dual-phase balancing servo and compensation circuit for a dual-phase unfolding bridge voltage feedback PWM modulator, according to embodiments of the present disclosure.

FIG. 7 illustrates a circuit implementation of a dual-phase unfolding bridge voltage feedback modulator with phase balance servo 120, including a twin-t filter to eliminate servo disturbances due to the switching frequency of the dual-phase unfolding bridge present in the current being sensed and balanced. The phase balance servo 120 may be a multi-phase balancing servo circuit, that can be included to ensure the average input current while the high-side MOSFET of each phase is ON is equal such that the average input current while phase 1 high-side MOSFET is ON is equal to the average input current while the phase 2 high-side MOSFET is ON. In some cases, the phase balance servo 120 incorporated into the dual-phase unfolding bridge can operate in a negative feedback loop that balances SENSE1+ and SENSE2+ by adjusting the duty-cycle of phase 1. The phase balance servo 120 can be configured to operate such that If SENSE1+ is higher than SENSE2+ the phase balance servo 120 output will decrease, which in turn will decrease the duty-cycle of phase 1, which in turn will decrease the input current of phase 1, which in turn will decrease SENSE1+, consequently increasing SENSE2+. Alternatively, if SENSE1+ is lower than SENSE2+ the phase balance servo 120 output will increase, which in turn will increase the duty-cycle of phase 1, which in turn will increase the input current of phase 1, which in turn will increase SENSE1+, consequently decreasing SENSE2+. R18, R19 and R17-C17 are added to the VMOD2 attenuator to match the source impedance of the VMOD1 attenuator. R18 and R19 set the bias point of the phase balance servo 120 output to +1.65 V in voltage feedback mode, which is the mid-point of the phase balance servo 120 amplifier power supply, to maximize the adjustment range of phase 1 duty-cycle. A twin-t notch filter tuned to 60 KHz is used to reject power supply ripple from the dual-phase balancing servo controller loop while minimizing phase shift that would otherwise overload the phase balance servo 120. The twin-t notch filter reduces switching noise. The dual-phase step-down converter described relies on current gain matching to ensure each phase provides half of the output current in cycle-by-cycle current limit mode. Each of the following can introduce phase-to-phase current gain mismatch that will result in phase-to-phase output current mismatch: current sense time constant mismatch, half-bridge inductance mismatch, and/or inductance drop with DC bias.

Figure 2B:
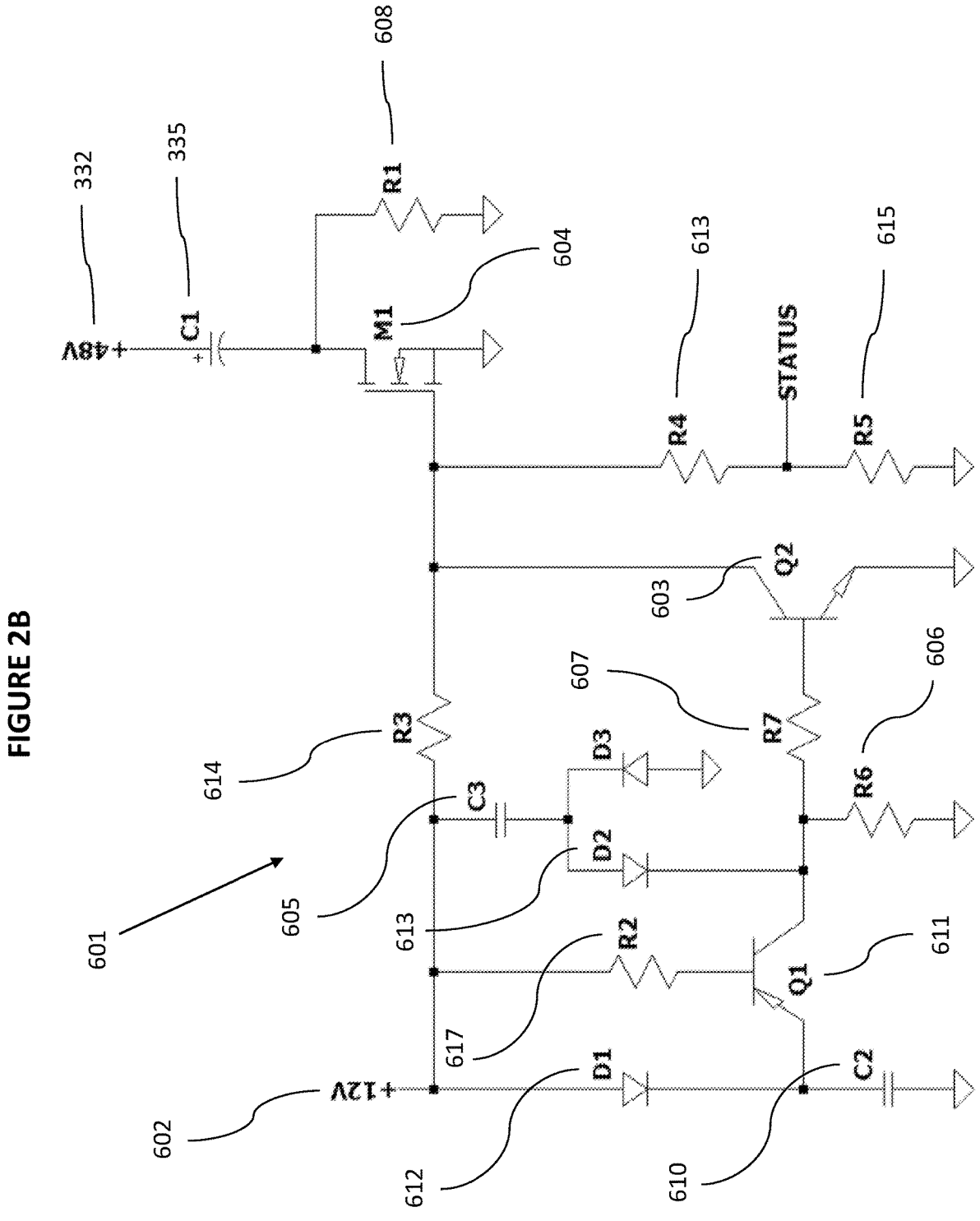
FIG. 2B illustrates an example electrical schematic of a reserve DC filter and energy storage unit circuit, according to embodiments of the present disclosure.

Referring to FIG. 2B an example of the soft-start circuit 601 that operates by sensing the 12V positive supply 602 during power on, which indicates that the PFC 133 supply has been energized. According to some embodiments, this in turn saturates an NPN transistor Q2 603, preventing a MOSFET M1 604 from turning on for more than 100-1000 ms (set by the time constant of capacitance C3 605 and resistance R6 606 resistance R7 607). During this delay, the DC bulk capacitance C1 335, 335 charges through R1 608, preventing surge and allowing the PFC 133 supply to energize. Once C3 605 charges, Q2 603 shuts off and M1 604 energizes and does not contribute to any series losses that would otherwise cause stress to M1 604 or add series loss during normal operation because the only current that needs to pass through M1 604 is the ripple current seen by C1 335.

According to some embodiments, a 48V positive supply input 332 is filtered via the DC bulk filter capacitance C1 335. The 12 V positive supply 602 can be derived from the 48V positive supply 332 using a voltage regulator with under-voltage lock-out (UVLO) monitoring. The voltage regulator enables the 12V supply 602 when the 48V positive supply input 332 increases above 75%-80% of the 48V nominal input voltage once enabled. The voltage regulator disables the 12V supply 602 when the 48V positive supply 332 drops below 60-80% of the 48V nominal input voltage, in some cases. When the 48V positive supply input 332 is enabled: C1 335 can be charged to the 48V positive supply input 332 through R1 608, in some cases a NTC inrush current limiter. When the 12V 602 supply is enabled capacitance C2 610 is charged to 12V less a single diode drop through diode D1 612, in some cases. PNP transistor Q1 611 base-emitter junction is reverse biased to one diode drop holding Q1 611 in the cut-off region. C3 605 is charged to 12 V minus one diode drop through diode D2 613, R6 606 and R7 607.

According to some embodiments The RC circuit of the soft-start circuit has the following time constants: 1) For C3 605 voltage lower than 12V minus two diode drops the RC circuit time constant is 119 ms [$\tau \approx$C3 605·(R6 606∥R7 607)]; 2) For C3 605 voltage higher than 12V minus two diode drops the RC circuit time constant is 429 ms [$\tau \approx$C3 605·R6 606]; If the 12V power supply rate of voltage charge is much faster than the time constant of C3 605 Q2 603 remains in the saturation region for approximately 0.4 seconds, holding M1 604 in the cut-off region, and allowing C1 335 to charge to 98.1% of the 48V positive supply input 332 through R1 608. In some cases, when Q2 603 can no longer sustain the voltage drop across resistance R3 614 the gate-to-source voltage of M1 604 will charge to approximately 10V. According to some embodiments, the source impedance of the resistor divider formed by R3 614, resistance R4 615 and resistance R5 616, and the Cgs capacitance of M1 604 create an RC time constant that soft-starts M1 604 [$\tau \approx$Cgs·{R3 614∥(R4 615+R5 616)}]. In some cases, the inrush current peak when M1 604 is enabled depends on the source impedance of the resistor divider formed by R3 614, R4 615 and R5 616, and the Cgs capacitance of M1 604. The status signal is approximately 0V while M1 604 remains disabled, and the status signal is approximately 5V after M1 604 is enabled, according to some embodiments. When the 12V supply 602 is disabled: C2 610 is discharged to one diode drop through the base-emitter junction of Q1 612 in some cases. The RC circuit can, in some cases, have a time constant of 69 ms ($\tau$=C2 610·(resistance R2 617∥R6 606∥R7 607)). If the 12V power supply 602 rate of voltage discharge is much faster than the time constant of C2 610 when the 12V power supply 602 drops about 1V, Q1 612 is saturated causing Q2 603 to become saturated, causing a soft-stop of M1 604, the status signal is approximately 0V while M1 604 remains disabled and C3 605 is discharged to one diode drop through D3 618.

The examples in FIG. 3B, FIG. 3C, and FIG. 3D demonstrates a feedback modulator and compensation circuit configured to receive and modify a signal from multi-phase unfolding bridge circuit 200.

FIG. 7 demonstrates a phase balance servo embodied in a multi-phase balancing servo circuit that senses the average current in each phase of the dual-phase unfolding bridge and corrects for imbalances between the average current of the two phases. Without the multi-phase balancing servo circuit, passive and active component tolerances within the control, drivers, and CSA circuits would result in the average current of one phase to be higher than the other, which could result in potential MOSFET runaway and ultimately failure of the overloaded phase. Integration of the PVFC with the phase balance servo circuit in the manner described herein results in reliable, robust operation as well as highly effective thermal balancing, benefits that other design approaches lack, and can in some cases enable the drive to the output isolation boost transformer 140 at high-wattage without inducing damaging saturation or flux walking.

In some cases, the PVFC 100 is configured to provide full double-galvanic isolation from the input sources, thus eliminating or reducing common-mode leakage currents or ground loops, improving precision of measurements within metrology, scientific, laboratory, or medical equipment, and greatly improving sound quality of audio equipment.

A phase balance servo can be included to ensure the average input current while phase 1 high-side MOSFET is ON is equal to the average input current while the phase 2 high-side MOSFET is ON. In some cases, the servo incorporated into the dual-phase unfolding bridge can operate in a negative feedback loop that balances SENSE1+ and SENSE2+ by adjusting the duty-cycle of phase 1. The servo can be configured such that if SENSE1+ is higher than SENSE2+ the servo output will decrease, which in turn will decrease the duty-cycle of phase 1, which in turn will decrease the input current of phase 1, which in turn will decrease SENSE1+, consequently increasing SENSE2+. If SENSE1+ is lower than SENSE2+ the servo output will increase, which in turn will increase the duty-cycle of phase 1, which in turn will increase the input current of phase 1, which in turn will increase SENSE1+, consequently decreasing SENSE2+. R22 and R23 set the bias point of the servo output to +1.65 V in current limit mode, which is the mid-point of the servo amplifier power supply, to maximize the adjustment range of phase 1 current limit threshold. A twin-t notch filter tuned to 60 KHz is used to reject power supply ripple from the dual-phase balancing servo loop while minimizing phase shift.

Figure 6A:
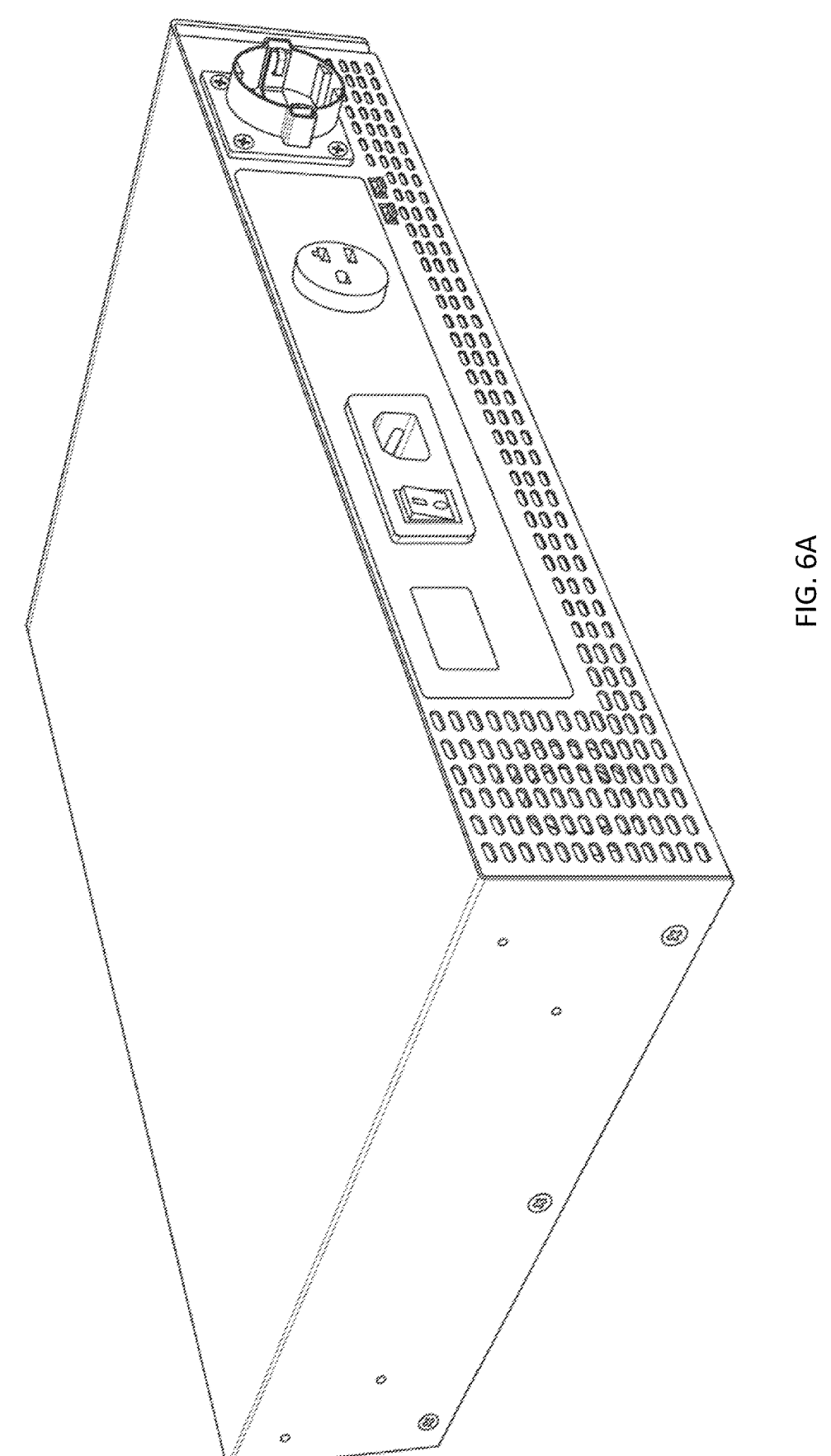
FIG. 6A illustrates a perspective view of a precision voltage and frequency converter, according to embodiments of the present disclosure.
Figure 6B:
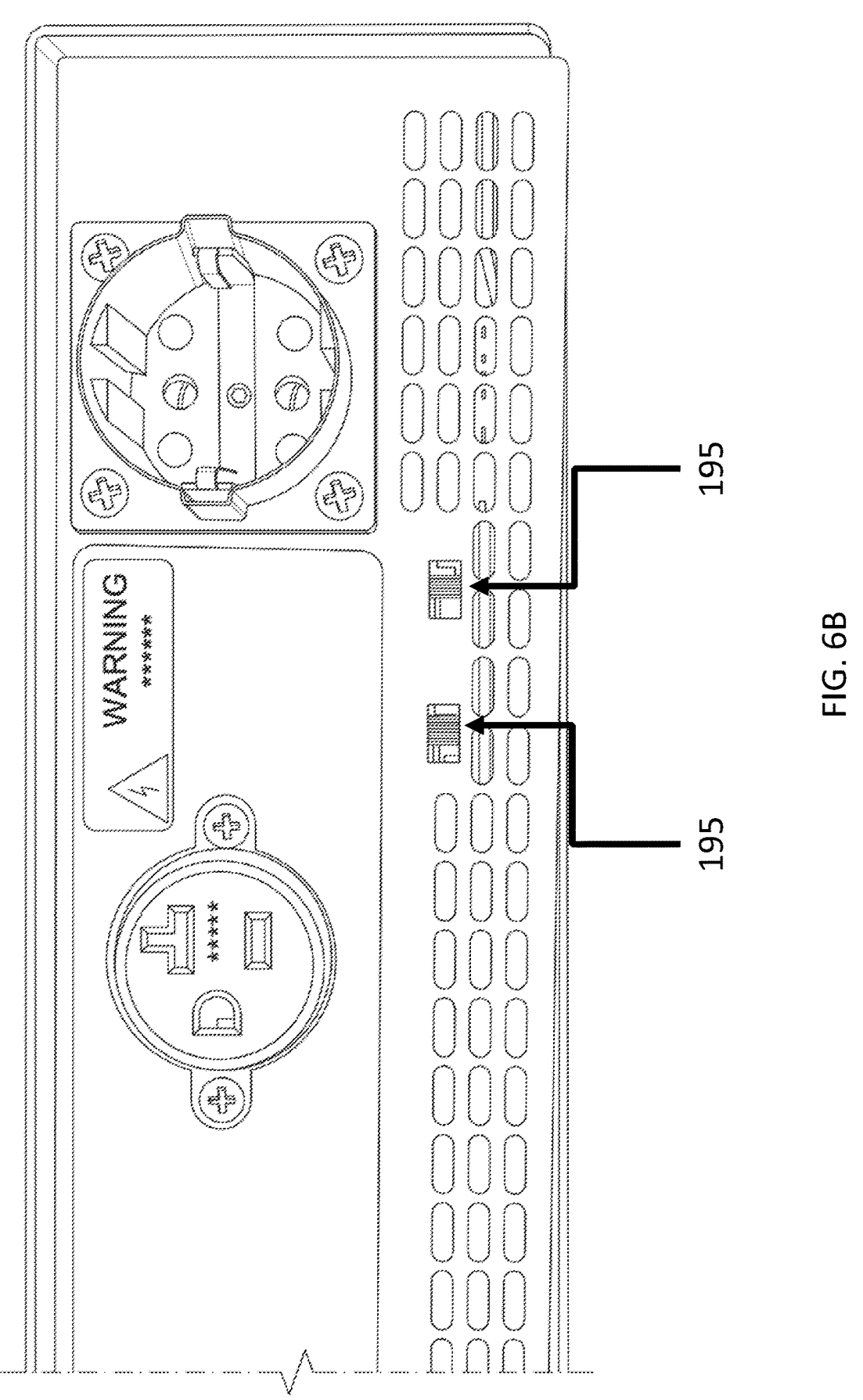
FIG. 6B illustrates an elevation view of a precision voltage and frequency converter, according to embodiments of the present disclosure.

In some cases, as shown in FIG. 6A and FIG. 6B, the PVFC 100 is configured to accommodate both 120V NEMA outlets and 230V Schuko outlets. According to embodiments of the present disclosure, the PVFC 100 is configured so that the device must be powered off before the output of the PVFC can be switched between the NEMA or Schuko outputs. In some cases, the PVFC 100 comprises one or more externally facing user-selectable switches 195 configured to adjust the output frequency to 50 Hz or 60 Hz 195 or to adjust the output voltage to 115V or 230V AC 195. The PVFC 100 can also include output receptacles that enable transmitting a first or second output AC signal to an external, electronic appliance. An electronic appliance can be, but is not limited to, an audio amplifier, an oscilloscope, precision scientific electronic signal amplifiers, or other electronic devices capable of calibration. The output receptacles can be configured to adapt to multiple output voltages or configurations in accordance with national standards for voltages.

Modifications to embodiments of the disclosure described in the foregoing are possible without departing from the scope of the disclosure as defined by the accompanying claims. Expressions such as "including," "comprising," "incorporating," "consisting of," "have," "is" used to describe and claim disclosed features are intended to be construed in a non-exclusive manner, namely allowing for items, components, or elements not explicitly described also to be present. Reference to the singular is also to be construed to relate to the plural.

The examples mentioned above are merely used for illustrative purposes and not meant to be limitations of the present disclosure. Furthermore, the approaches in various embodiments of the present disclosure are implemented according to the universal conversion method and related circuitry provided by the embodiments of the present disclosure.

What is claimed is:

1. A precision voltage and frequency converter, comprising:
   an AC input receptacle for receiving an input AC voltage;
   a power factor correction circuit configured to convert the input AC voltage to a regulated DC output;
   a multi-phase unfolding bridge circuit configured to convert the regulated DC output to a substantially pure sinusoidal AC output;
   an AM filter block configured to filter electromagnetic interference noise;
   an output isolation boost transformer having a first side and a second side, wherein the isolation transformer is configured to receive an unfolded half-sine signal generated by the multi-phase unfolding bridge circuit, output filter, control circuit and compensation circuit at the isolation transformer first side and to generate on the second side a first output AC signal having a first output amplitude, a first output frequency, a first output voltage, a first output impedance, and a first output current, wherein the AM filter block to filter electromagnetic interference noise.

2. The precision voltage and frequency converter of claim 1, further comprising a reserve DC Filter and Energy Storage Unit configured to receive the regulated DC output.

3. The precision voltage and frequency converter of claim 1, further comprising a feedback modulator configured to receive and modify a signal from the multi-phase unfolding bridge circuit.

4. The precision voltage and frequency converter of claim 1, further comprising a current feed-forward compensation circuit configured to compensate for an output impedance of the output isolation boost transformer.

5. The precision voltage and frequency converter of claim 1, further comprising an isolated feedback voltage control circuit configured to regulate the first output AC signal via the second side of the output isolation boost transformer.

6. The precision voltage and frequency converter of claim 5, further comprising an isolated feedback loop regulator configured to directly sense the output AC voltage and to provide safety isolated feedback for precisely controlling the output AC amplitude to within 1% line and load regulation.

7. The precision voltage and frequency converter of claim 2, further comprising a soft-start circuit configured to control power surges of the precision voltage and frequency converter.

8. The precision voltage and frequency converter of claim 1, wherein the multi-phase unfolding bridge circuit further comprises:
   a phase balance servo configured to match current flowing between two or more phases within the multi-phase unfolding bridge circuit;
   wherein the phase balance servo is configured to equally drive two or more phases, enabling drive to said isolation transformer at a power draw above 1000 watts.

9. The precision voltage and frequency converter of claim 1, further comprising one or more externally facing user-selectable switches configured to adjust the output frequency to 50 Hz or 60 Hz or to adjust the output voltage to 115V or 230V AC.

10. The precision voltage and frequency converter of claim 1, further comprising one or more output receptacles for transmitting the first output AC signal or the second output AC signal to an external appliance.

11. The precision voltage and frequency converter of claim 10, wherein said one or more output receptacles are configured to enable selection of one or more said output voltages as per country configurations.

12. The precision voltage and frequency converter of claim 1, further comprising:
   a temperature control unit;
   a fan control unit;
   wherein the temperature control unit is configured to operate the fan control unit at one or more operating temperatures.

13. A method of removing aberrations, noise, frequency and amplitude distortions, or load errors due to dissipative copper losses in an external power distribution system via a precision voltage and frequency converter, comprising receiving an input AC signal having a conduction angle via an AC input receptacle;
   converting the input AC signal into an input DC signal via a power factor correction circuit;
   converting the input DC signal, via a multi-phase unfolding bridge circuit and creating a substantially pure sinusoidal AC signal via a voltage and current feedback modulator and compensation circuit; and
   transforming an unfolded half-sine signal via an output isolation boost transformer generating an output AC signal having an output amplitude, an output frequency, an output voltage, an output impedance, and an output current.

14. The method of claim 13, further comprising:
   compensating for the output impedance of the output isolation boost transformer via a current feed-forward compensation circuit.

15. The method of claim 13, further comprising:
   filtering the output AC signal via the output isolation boost transformer and an isolated feedback voltage control circuit.

16. The method of claim 13, further comprising:
   sensing the output AC voltage;
   providing isolated feedback; and
   controlling the output AC amplitude via an isolated feedback loop regulator, to an AC amplitude to within 1% line and load regulation.

17. The method of claim 13, further comprising:
   equally driving and matching the bridge current flowing between two or more phases within the multi-phase unfolding bridge circuit via a multi-phase balancing servo controller.

18. The method of claim 13 further comprising:
   filtering the input DC signal via a DC filter and energy storage unit.

19. The method of claim 18 further comprising
   providing a reserve for the multi-phase unfolding bridge circuit; and
   stabilizing the multi-phase unfolding bridge circuit in response to load changes.

\*   \*   \*   \*   \*